Figure 1:
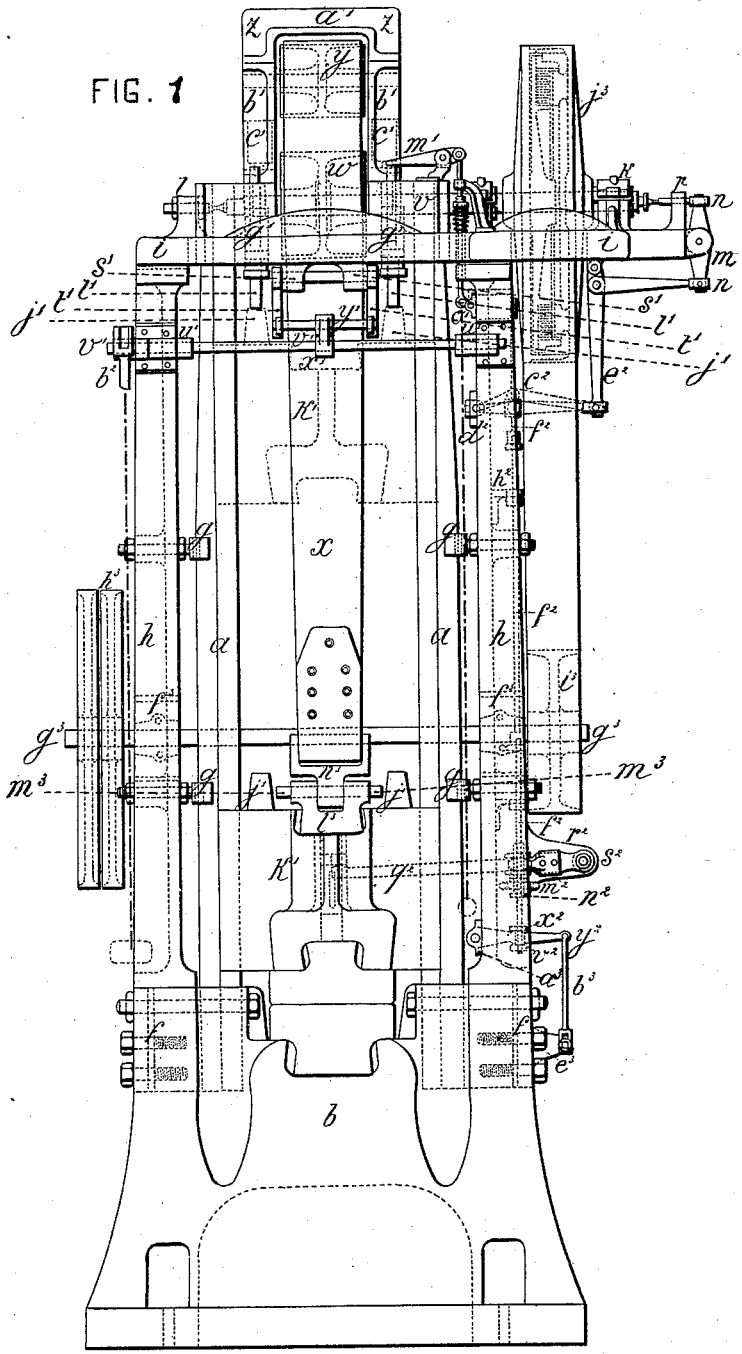

(No Model.) 14 Sheets—Sheet 1.

G. N. SCHOENBERG.
DROP HAMMER.

No. 318,305. Patented May 19, 1885.

Witnesses
John C. Tunbridge
Gustav Schneppé

Inventor:
G. N. Schoenberg
by his attorneys
Briesen & Steele (No Model.) 14 Sheets—Sheet 2.

G. N. SCHOENBERG.
DROP HAMMER.

No. 318,305. Patented May 19, 1885.

Witnesses:
John C. Tunbridge
Gustav Schneppé

Inventor:
G. N. Schoenberg
by his attorneys
Briesen & Steele (No Model.)
14 Sheets—Sheet 3.
G. N. SCHOENBERG.
DROP HAMMER.
No. 318,305.
Patented May 19, 1885.
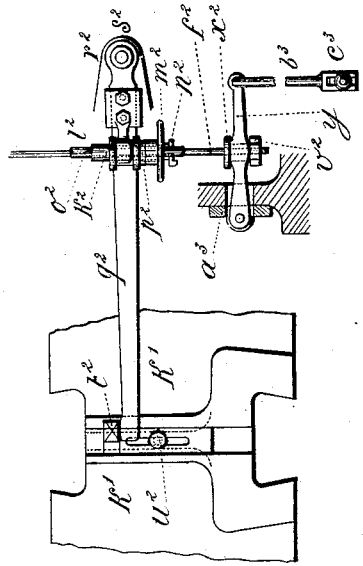
FIG. 11.
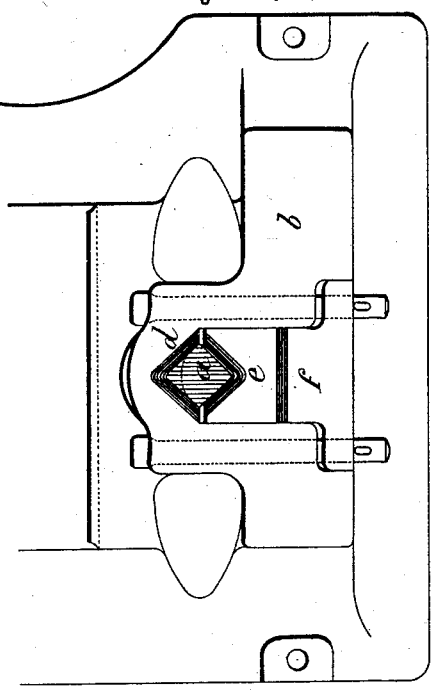
FIG. 3.
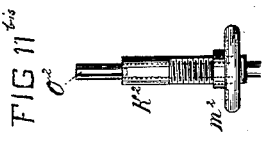
FIG. 11 bis
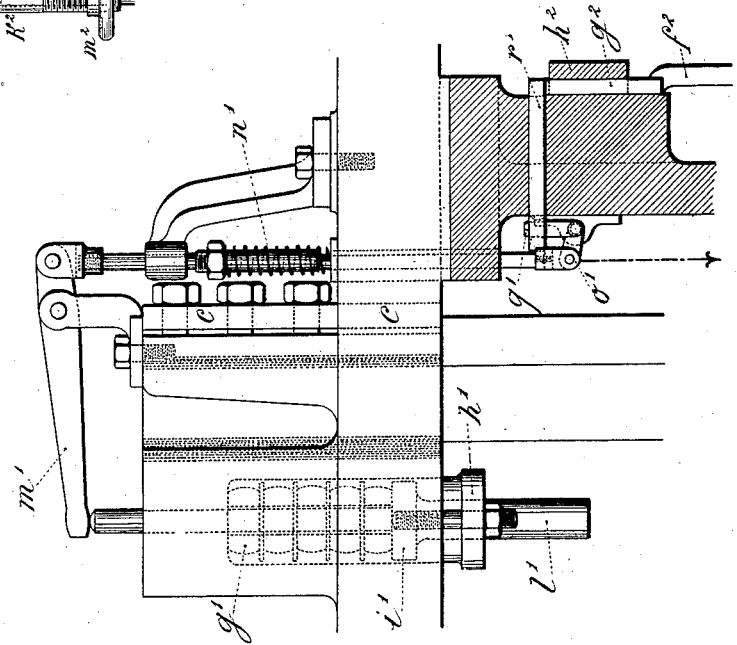
FIG. 6.
Witnesses:
John C. Tunbridge
Gustav Schneppe
Inventor
G. N. Schoenberg
by his attorneys
Briesen & Steele

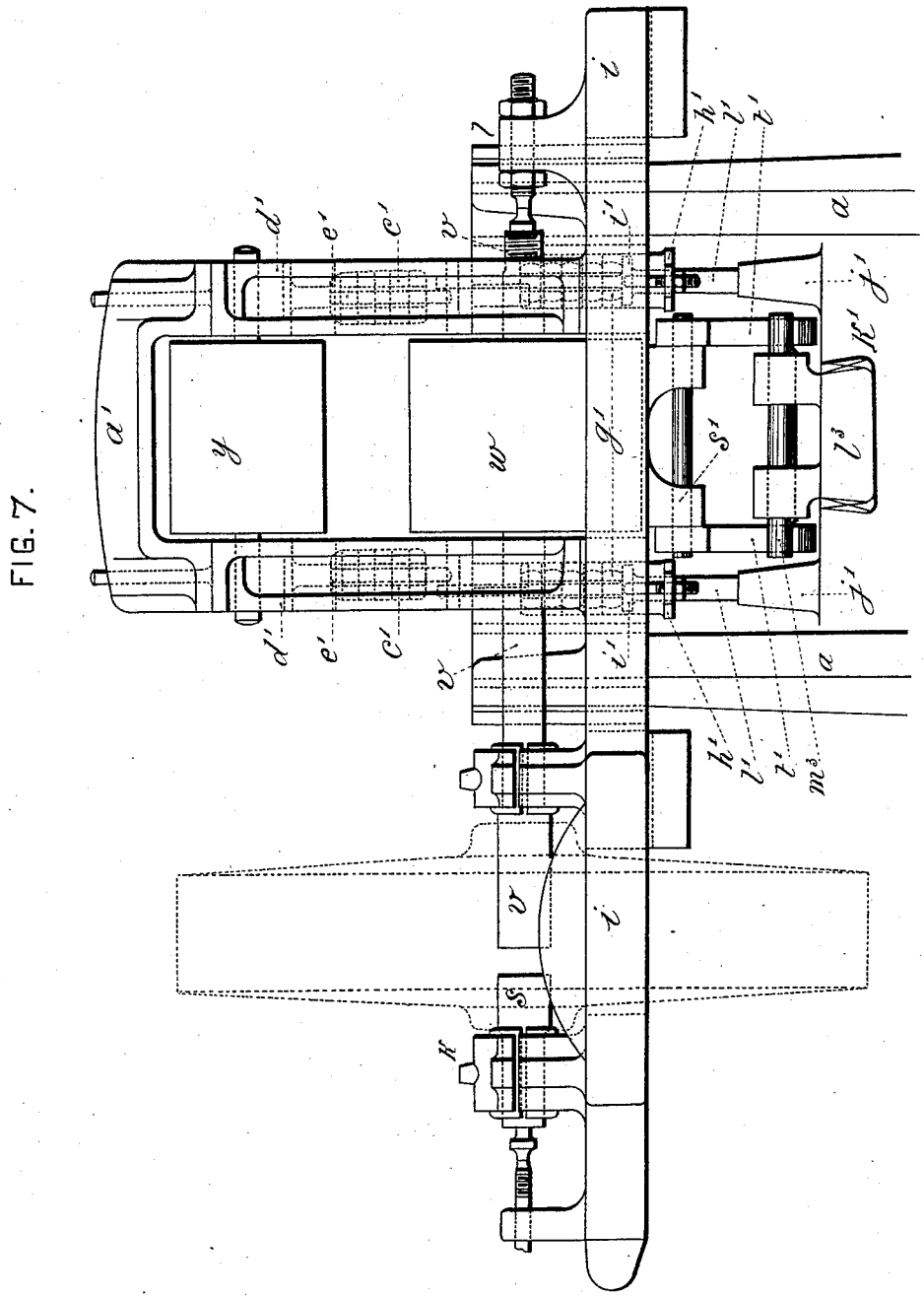

(No Model.) 14 Sheets—Sheet 5.

G. N. SCHOENBERG.
DROP HAMMER.

No. 318,305. Patented May 19, 1885.

Witnesses:
John C. Tunbridge
Gustav Schneppe

Inventor:
G. N. Schoenberg
by his attorneys
Briesen & Steele (No Model.) 14 Sheets—Sheet 6.

G. N. SCHOENBERG.
DROP HAMMER.

No. 318,305. Patented May 19, 1885.

Witnesses:
John C. Tunbridge.
Gustav Schneppe.

Inventor:
G. N. Schoenberg
by his attorneys
Briesen & Steele

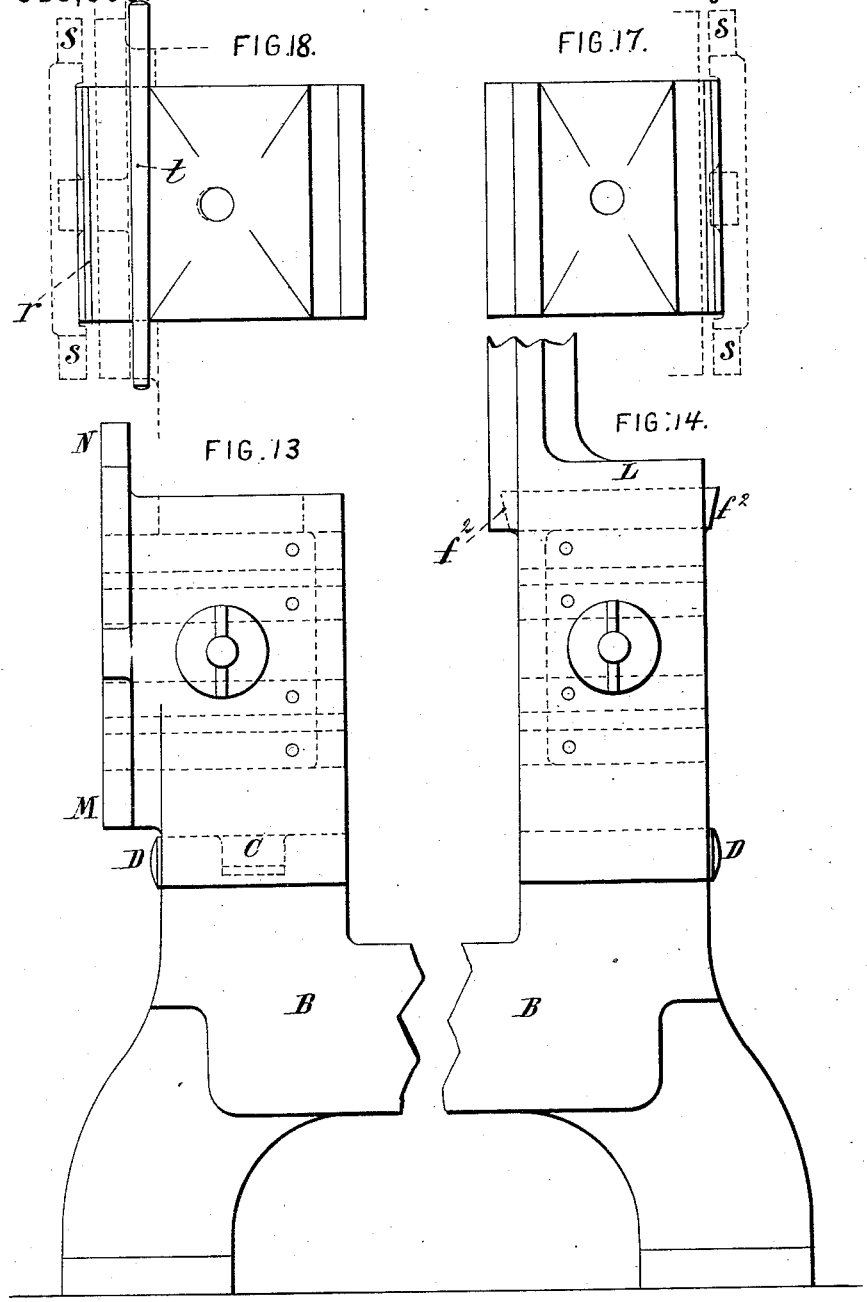

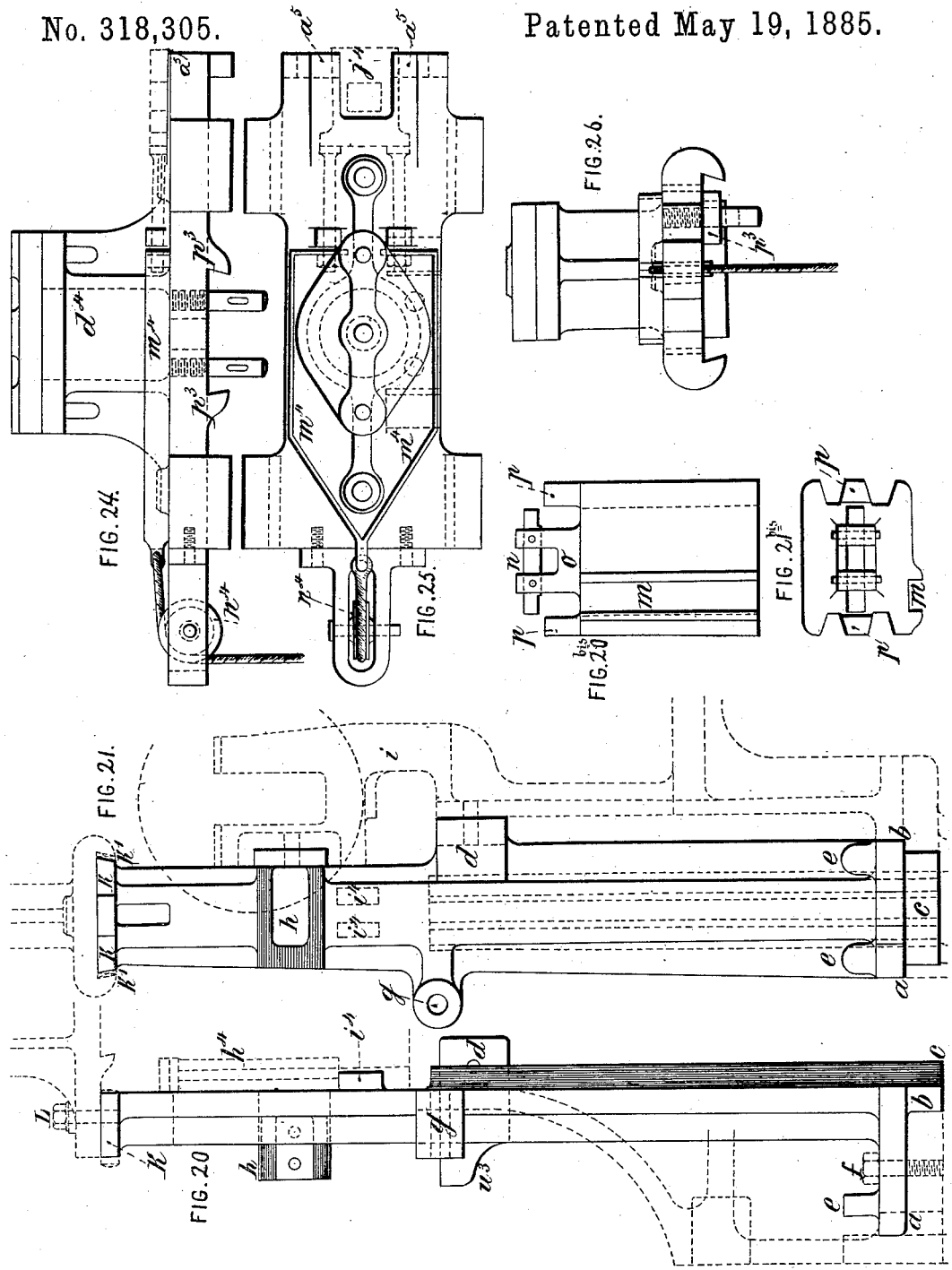

(No Model.) G. N. SCHOENBERG. 14 Sheets—Sheet 9.
DROP HAMMER.

No. 318,305. Patented May 19, 1885.

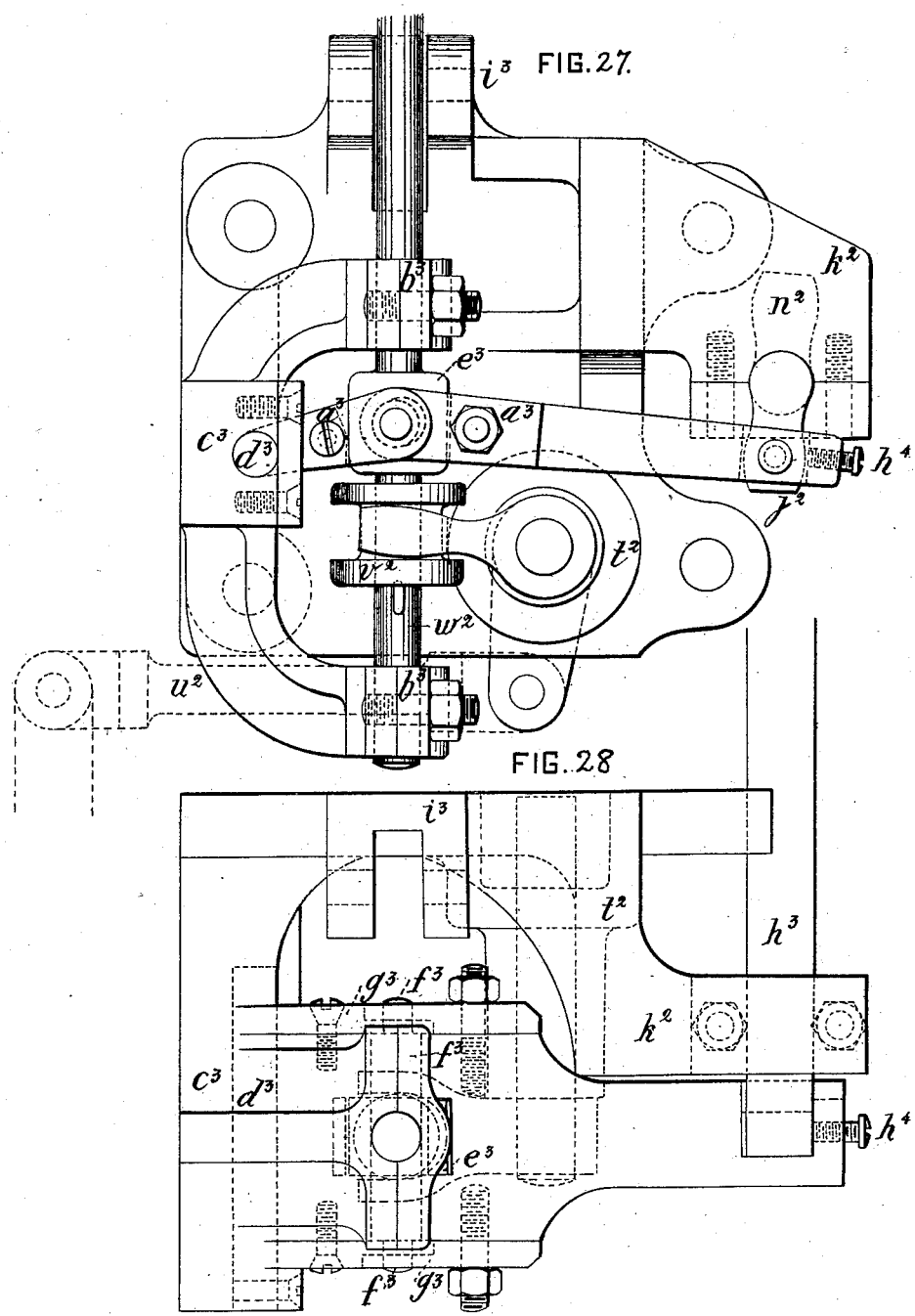

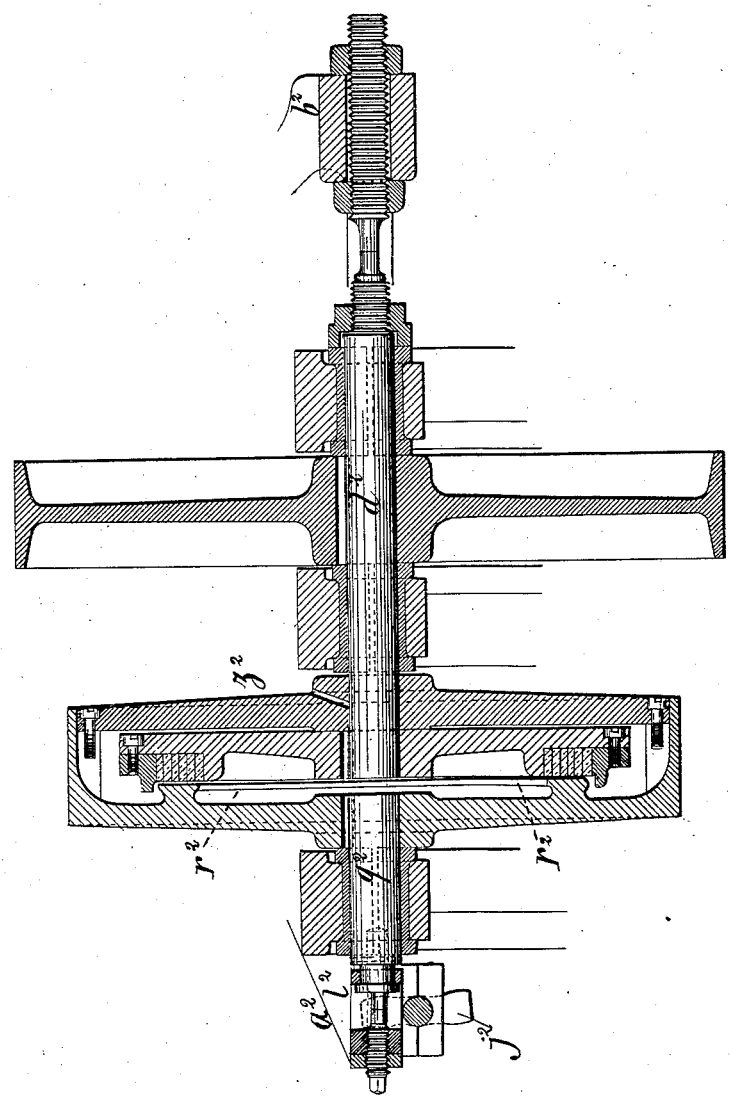

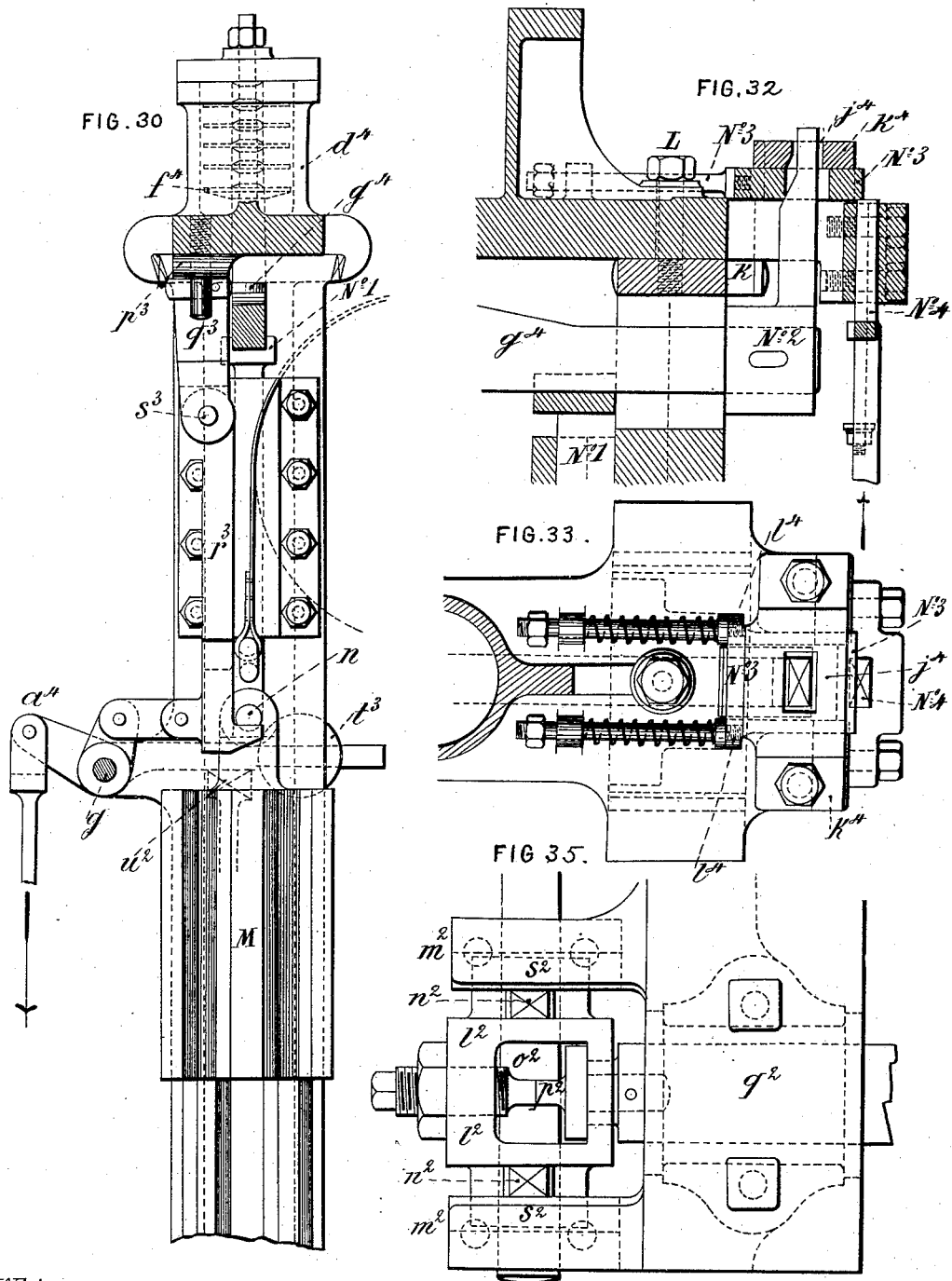

(No Model.) 14 Sheets—Sheet 13.

G. N. SCHOENBERG.
DROP HAMMER.

No. 318,305. Patented May 19, 1885.

Witnesses:
John C. Tunbridge.
Gustav Schneppé.

Inventor:
G. N. Schoenberg
by his attorneys
Briesen & Steele (No Model.)

14 Sheets—Sheet 14.

G. N. SCHOENBERG.
DROP HAMMER.

No. 318,305.  Patented May 19, 1885.

Witnesses
John C. Tunbridge
Gustav Schneppe

Inventor:
G. N. Schoenberg
by his attorneys
Briesen & Steele

UNITED STATES PATENT OFFICE.

GABRIEL NICOLAS SCHOENBERG, OF BOULOGNE, FRANCE.

DROP-HAMMER.

SPECIFICATION forming part of Letters Patent No. 318,305, dated May 19, 1885.

Application filed August 2, 1884. (No model.)

*To all whom it may concern:*

Be it known that I, GABRIEL NICOLAS SCHOENBERG, of the city of Boulogne-sur-Seine, near Paris, France, have invented new and useful Improvements in Power-Hammers, Stamping-Machines, or other Similar Percussion Apparatus, of which the following is a full, clear, and exact description.

This invention relates to a new percussion apparatus, such as power-hammers, stamping-machines, or the like, in which the monkey or hammer is raised and retained automatically in guides or uprights that have elastic packings, whereby the shocks are isolated, said packings being capable of adjustment in the direction of the wear of the monkey or hammer.

The invention comprises two types of machines, the one for short falls having heavy hammers, and the other, for long falls, having hammers of proportionally less weight. In the first class of machines, having a fall not exceeding four feet, the monkey would have a weight of two and one-half hundred-weight and upward. In the second class of machines, having a fall of from eight to nine feet, for example, the monkey would have a weight of not exceeding one hundred-weight, or less. The first type of apparatus is represented in general arrangement and principal details by the Figures 1 to 11, the second type by the Figs. 12 to 36, inclusive.

Figure 2:
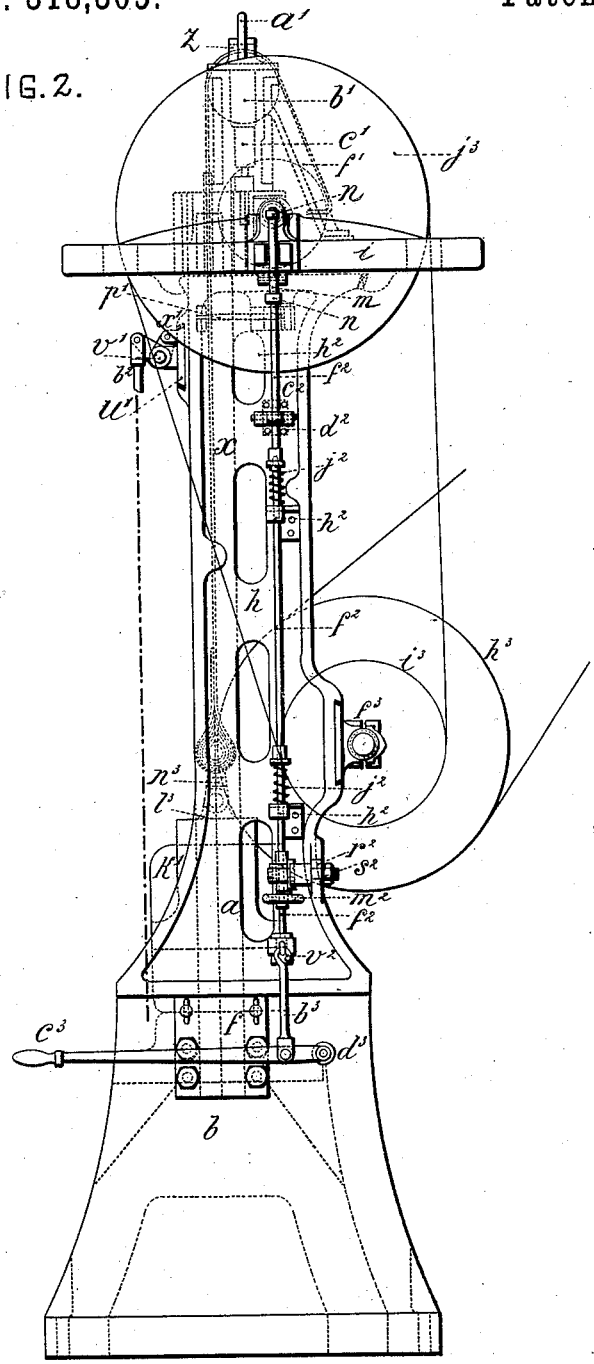
Figure 4:
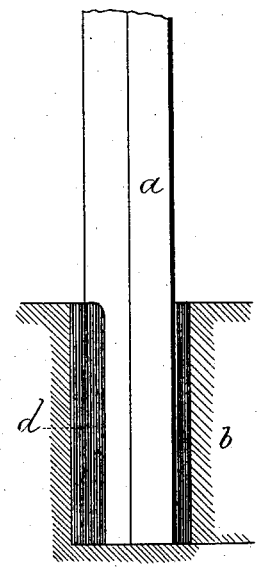
Figure 5:
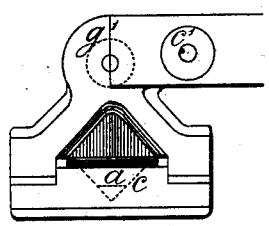
Figure 9:
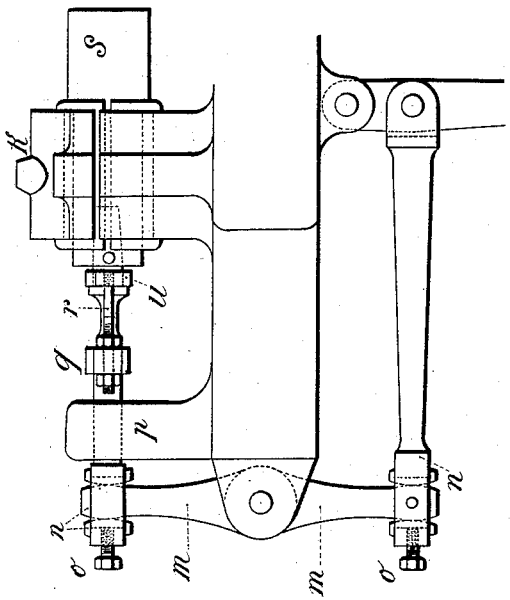
Figure 10:
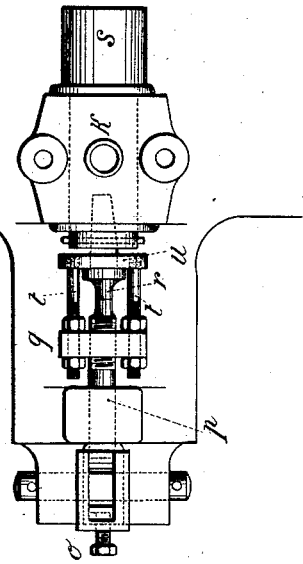
Figure 8:
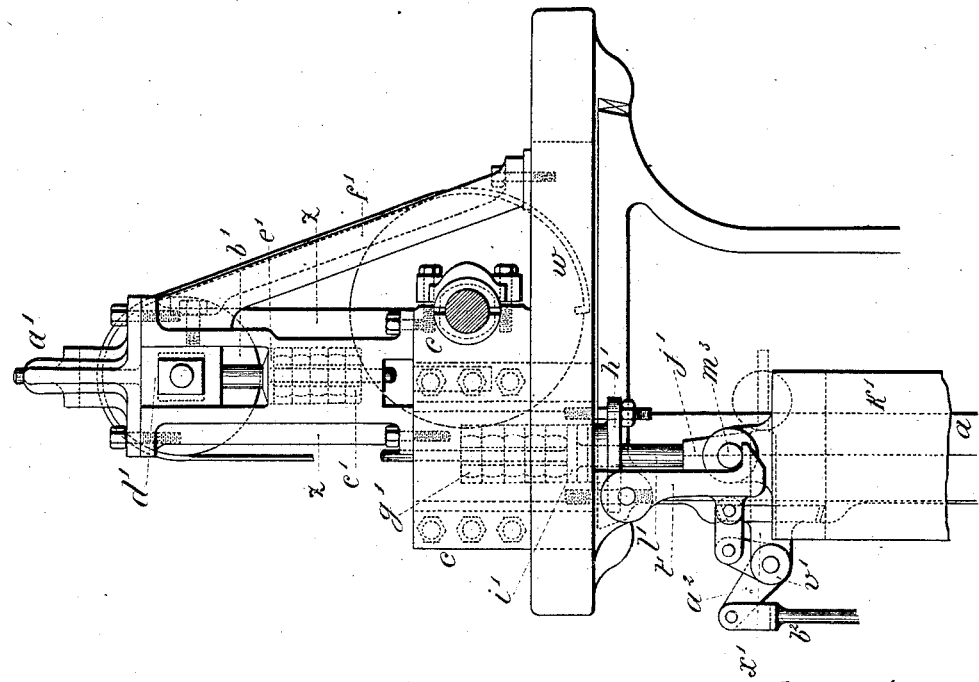
Figure 19:
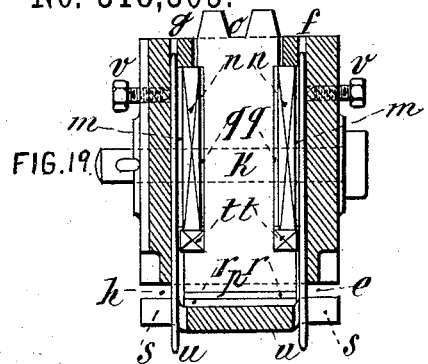
Figure 16:
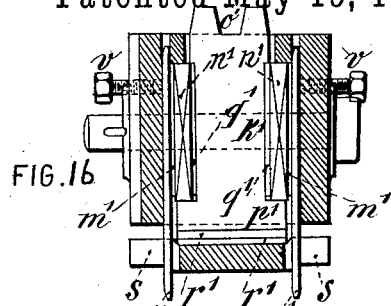
Figure 12:
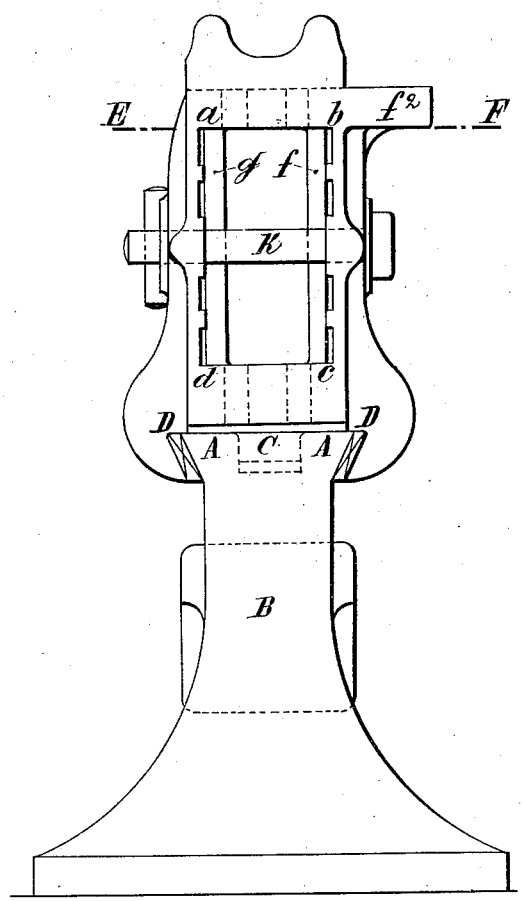
Figure 22:
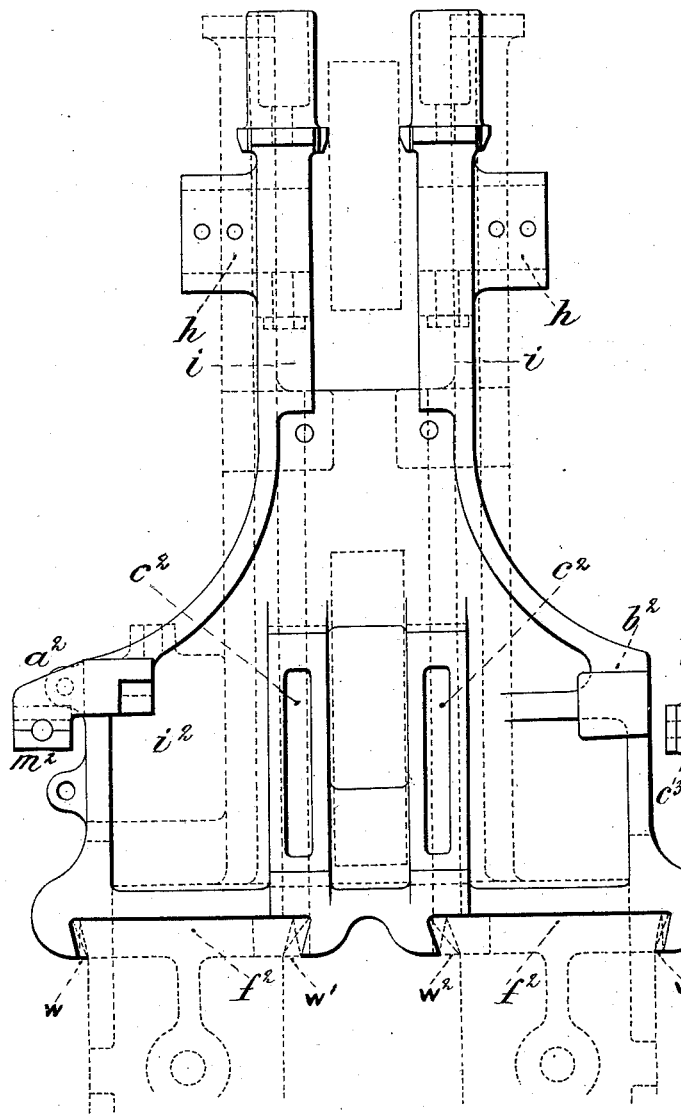
Figure 31:
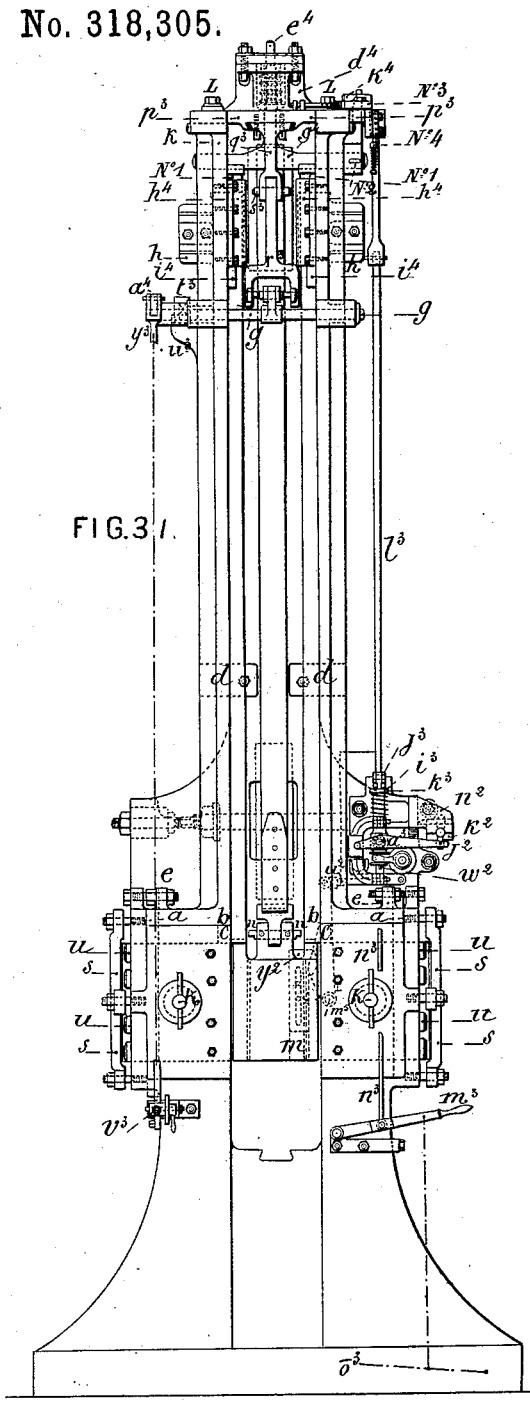
Figure 34:
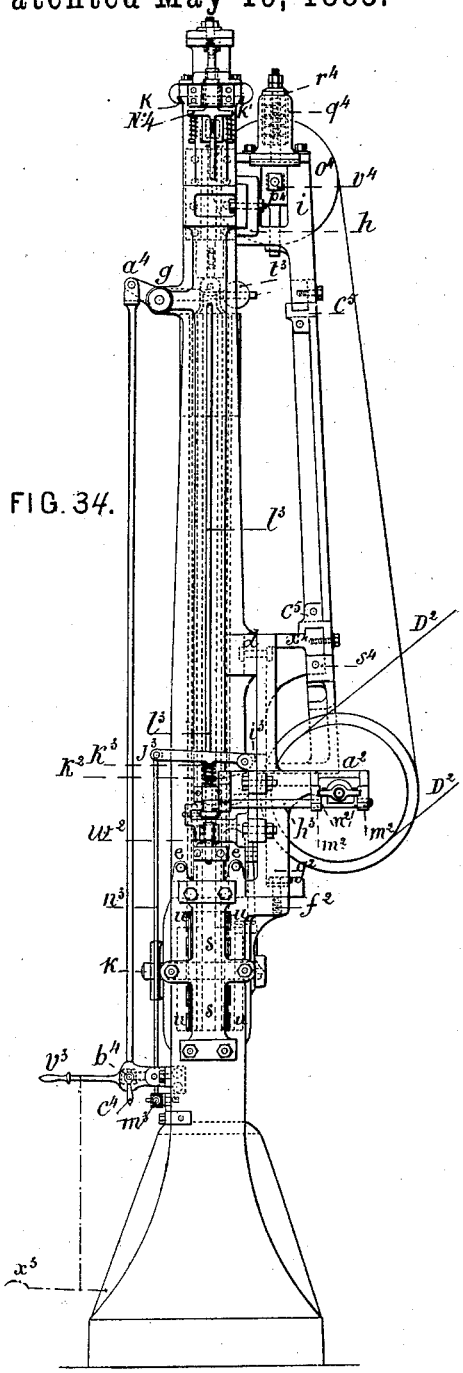
Figure 36:
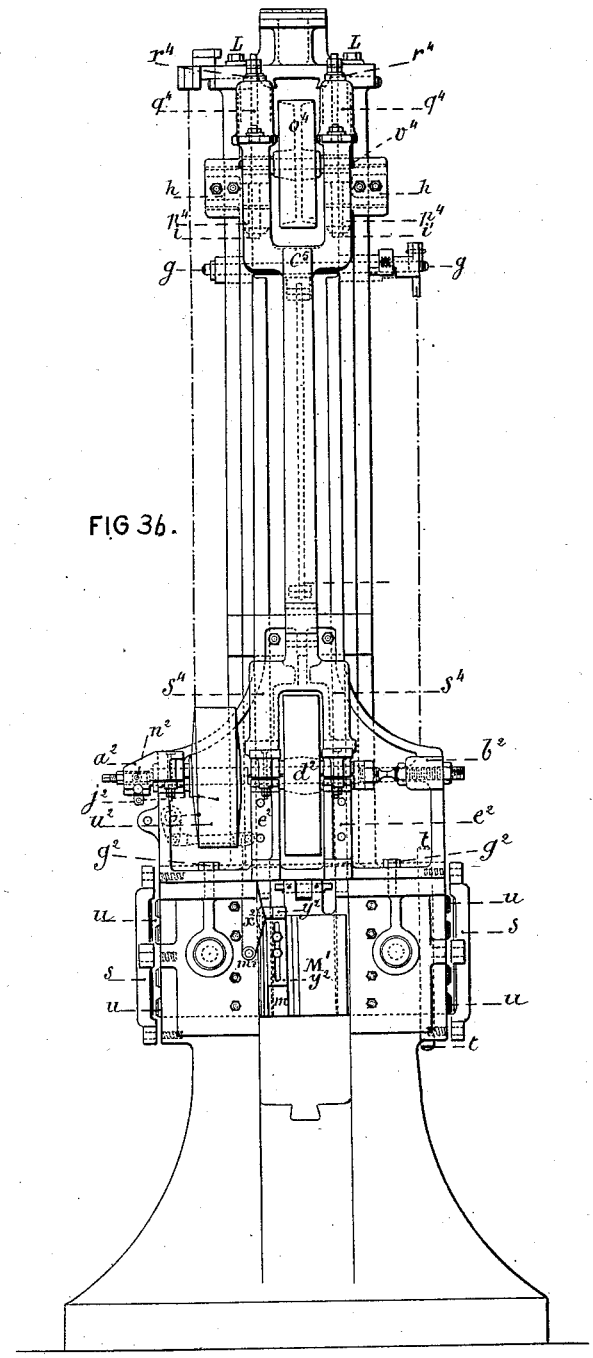

Fig. 1 is a general face view of the machine; Fig. 2, a side elevation of the same; Fig. 3, a section of one of the guides, taken across the packing-pieces. Fig. 4 is an elevation of the same part of the guides. Fig. 5 is a sectional plan of the puper part of one of the guides. Fig. 6 is a detail in the mechanism. Fig. 7 is a face view on a larger scale of the friction-clutch mechanism mounted at the upper part of the machine. Fig. 8 is a corresponding side view of the same. Fig. 9 is an elevation on a larger scale of the friction-clutch gear. Fig. 10 is a plan of same. Fig. 11 is a detail elevation on a larger scale of the mechanism for throwing the friction-clutch into gear by hand or automatically. Fig. 11$^{bis}$ shows an enlarged view of part of Fig. 11. Fig. 12 is a side view, and Fig. 13 a partial face view, of a modified construction of base. Fig. 14 is a partial face view, and Fig. 15 a side view, of the base of another modification. Fig. 16 is a horizontal section on the line G H, Fig. 15. Fig. 17 is a side view of the block $o'$ $p'$, which is shown in Fig. 16. Fig. 18 is a side view of the block $o$ $p$, which is shown in Fig. 19. Fig. 19 is a horizontal section on the line E F, Fig. 12. Fig. 20 is a face view of the standard of the modified machine. Fig. 20$^{bis}$ is a back view of the monkey. Fig. 21$^{bis}$, a top view of same. Fig. 21 is a side view of the standard. Fig. 22 is an enlarged back view, and Fig. 23 an enlarged side view, of the central portion of the frame of the modified machine. Fig. 24 is a face view, Fig. 25 a top view, and Fig. 26 an end view, of the upper part of the frame of the modified machine. Fig. 27 is an enlarged side view of the toggle mechanism of the modified machine. Fig. 28 is a top view of the same. Fig. 29 is a detail horizontal section of the driving-shaft of same. Fig. 30 is an enlarged cross-section of the upper part of the modified machine. Fig. 31 is a face view of the modified machine. Fig. 32 is a vertical longitudinal section of the upper part of said modified machine. Fig. 33 is a top view, partly in section, of said upper part. Fig. 34 is a side view of the modified machine. Fig. 35 is a detail side view of the bearings $m^2$ of the modified machine and of their connections. Fig. 36 is a back view of the modified machine.

In the first type of machine hereinbefore referred to the monkey is guided, as usual, by two angular guide-bars, $a$ $a$, whose lower ends are fixed in clamps in the base $b$ of the machine, Figs. 1, 2, 3, 4, packing-strips of leather, folded angularly and covered with a number of very thin plates of sheet-iron of the same form as the leather, as shown at $d$, Figs. 3 and 4, being applied around the ends of the guide-bars, which are clamped in place by the angular filling-block $e$, Fig. 3, said block being also furnished with strips of leather throughout the whole length of the recess. The block $e$ is held in place by the cover $f$, Figs. 1, 2, 3, provided with lugs through which are passed cotters and screw-bolts, as indicated in the three figures, and which serve to firmly clamp the bottom end of the guides in their sockets. The upper ends of the guides are reduced to one-half their thickness, as shown in Fig. 5, in order to serve as a support for the head of the framing in which they are fitted by means of packing pieces of leather and sheet-iron of the same form and thickness as those for the base and by a cap, $c$, Figs. 5 and 6, with pieces of leather superposed and riveted and secured by screw-bolts, as shown in Figs. 6 and 8. The distance between the guides can be easily regulated by simply adding to or reducing the number of thin sheet-iron plates without removing the leather packing. The guides are held rigidly in position by means of four adjustable steadying-pieces $g\ g\ g\ g$, Fig. 1, faced with leather, leather washers being also inserted beneath the nuts of the bolts passing through the standards $h\ h$. All these elastic surfaces are reduced by the pressure to the condition of isolation for absorbing all excessive vibration caused by the blows of the hammer, but only for a velocity on impact not exceeding sixteen feet. In this manner when once the adjustment is effected it will be maintained for a length of time without any sensible amount of wear of the sliding surfaces, and immediately the wear becomes appreciable it is simply necessary to slacken the covering-plates at top and bottom of one of the guides only, and remove one or two of the sheet-iron packing-strips at top and bottom, and then to tighten up the covers again, as well as the two angular steadying-pieces $g\ g$ on the same side. In this manner a fresh adjustment is quickly obtained, which will prevent breakages and dislocations. By sufficiently recessing the parts one in the other, regard being had to the weight of the hammer, the leather after being once pressed will last for an indefinite time, and remain consequently in the condition of an isolating body between the metallic surfaces upon which the hammer continually acts by the vibration which it causes.

Referring to Figs. 3 and 4, it will be seen that the original form of the portions of the guide-rods which are held in the socket may be successively reduced as the guides become worn without altering the conditions of absorption and adjustment. The dotted lines in Fig. 3 show the alternate form, if after prolonged wear each guide had been successively advanced to the extent of wear, thus proving that the system retains its isolating and adjusting properties until the guides are completely worn out. The cast-iron standards $h\ h$, Figs. 1 and 2, are fixed both to the base $b$ and to the top plate, $i\ i$, whereby they both consolidate the entire framing of the machine, and also serve, in conjunction with said plate, to carry the parts employed to work the hammer, whether by hand or power. At the upper part of these standards are fixed two bearings, $u'\ u'$, Figs. 1 and 2, in which is mounted a shaft, $v'$, Figs. 8, 1, 2, having a central crank, $x'$, connected to the hooks $t'$ by a pin, $y'$, Fig. 1, and having at its left-hand end a crank-arm, $a^2$, Fig. 8, to which is attached a connecting-rod, $b^2$, descending to the lower part of the machine, where it is operated either by hand or foot for releasing the monkey and letting it drop.

To the right-hand standard at $d^2$, Fig. 2, is jointed one end of the toggle $c^2$, Figs. 1 and 2, whose other end is connected to lever $e^2$ by means of similar adjustments to those indicated at the lower part of lever $m$, Fig. 9. The center-joint pin of the toggle, whose extent of motion is indicated in dotted outline in Fig. 1, is connected with the long vertical rod $f^2$, Figs. 1, 2, 6, a similar toggle arrangement being also illustrated on a larger scale in Figs. 27 and 28, as will be hereinafter described, for long drop-hammers on this improved system. The rod $f^2$ extends upward above the joint and terminates in a bolt, $g^2$, Fig. 6, which moves up and down in a guide, $h^2$, screwed to standard $h$, as shown in Fig. 2. The rod has enlargements below the joint, between which and the guide $h^2$ on the standards spiral springs $j^2\ j^2$ are compressed, Fig. 2. The bottom end of the rod $f^2$ is enlarged at $l^2$, Fig. 11, to receive the screwed socket $k^2$ and the corresponding screwed hand-nut, $m^2$, as shown in Figs. 1, 2, 11, the whole being retained by a cotter, $n^2$. Upon this screwed socket $k^2$, which is prevented from turning on the rod by a keyway, $o^2$, in the enlargement $l^2$, is fitted a grooved sleeve, $p^2$, which is caused to travel up and down upon said socket by rotating the hand-nut $m^2$. A fork engages in the groove of sleeve $p^2$, the tail end of said fork embracing and being bolted to the lever $q^2$, Figs. 1 and 11, which is pivoted at $s^2$ to a bracket, $r^2$, cast on the standard, the other end being directly in the path of the tappet $t^2$, fixed adjustably by bolts $u^2$ in a groove in the monkey $k'$. The tappet should always strike the end of lever $q^2$ when the tools carried by the monkey are in contact at the end of the drop and when it is desired to throw the clutch into gear automatically. The rod $f^2$ extends below the cotter $n^2$, and is threaded at the end to receive a nut, $v^2$, screwing against the collar $x^2$, which is embraced by a lever, $y^2$, pivoted at one end in a bracket, $a^3$, upon the standard, the other end being connected by a rod, $b^3$, to the hand-lever $c^3$, pivoted at $d^3$ to a stud, $e^3$, on the base $b$, for throwing the clutch into gear by hand when it is not desired to work the hammer automatically. The two standards also carry in pillow-blocks $f^3$, Figs. 1, 2, the horizontal driving-shaft $g^3$, having fast and loose pulleys $h^3$ and a pulley $i^3$, by which the motion is transmitted to the friction-clutch pulley $j^3$. In this arrangement it has been possible to place the plate carrying the friction-gear at the upper part of the machine, without affecting its stability, by limiting the height of fall and more especially the velocity on impact for the size of hammer for which this class of machine is intended.

The plate $iii$, the form of which is seen in Figs. 1, 2, 7, is more particularly intended to establish connection between the bearing $k$ of the pulley $j^3$, Figs. 1 and 7, and the abutment $l$. The abutment $l$ serves to adjust the pressure and compensate for wear of the friction-surfaces. This is already described in English Patent No. 392 of 1883, and is not claimed as new in the present case.

The arrangement shown in Figs 9, 10 is specially designed for this type of drop-hammer as applied to the raising of weights by friction. It is composed of a lever, $m$, Figs. 1, 2, 9, 10, whose ends work between hardened steel bushes $nn$, having adjusting-screws $oo$, whereby the oscillation of the lever may be transmitted with absolute accuracy. The upper or thrust rod, $n$, passes through the support $p$, and is screwed into a cross-head, $q$, until its extremity, which is pivot-shaped and hardened, abuts against a pivot, $r$, fitted and cottered in the end of the shaft $s$, which carries the cast-iron friction-disk represented in dotted lines in Fig. 1, and described in the specification of the said former English patent for the friction-coupling before referred to. The cross-head $q$ is connected by screw-rods $tt$, (see Fig. 10,) to a second cross-head, $u$, pressing against a flange on pivot, $r$, so that if after having screwed the thrust-rod $n$ into the cross-head $q$ there should be the slightest play between the two hardened pivot-points it may be rectified by means of the nuts on the rods $t$. By this arrangement the shaft $s$, the flanged pivot $r$, and the friction-disk in connection therewith are free to turn in the bearing $k$ and cross-bar $u$ without allowing the slightest play between the rotating and stationary pivots or between the latter and the lever $m$.

The leather friction-surface may be pressed up against the cast-iron surface with great facility and certainty, as hereinafter explained.

The plate $i$, as will be seen, establishes perfect solidity of the mechanism placed upon it, and an additional advantage derived from the arrangement is the capability of applying the pressure by means of pivots, thus avoiding all intermediate deflection, play, and friction of the transmitting mechanism.

Upon a shaft, $v$, which is carried by the plate $i$, and which holds the other part of the friction-clutch, Figs. 1 and 7, is keyed a central pulley, $w$, to which the strap $x$, Figs. 1 and 2, is attached by means of suitable clamping-plates.

Upon two of the bearings of shaft $v$, which are connected to the upper clamps of the guides, as clearly shown in Fig. 8, is fixed a double frame, $zz$, Figs. 7, 8, 1, and 2, resting thereon, whose upper ends are connected by the cross-frame $a'$ and tied to the plate $i$ by the struts $f'$. Each side of the frame $z$ has a slot, $b'$, and a circular cavity, $c'$, to receive a spiral spring or block of india-rubber with intervening disks of sheet-iron, as shown in Figs. 7 and 8.

In the slots $b'$ are fitted to slide bearings $d'$, having guide-stems projecting from their upper and under sides, the latter passing down through the elastic material, which is compressed by the metal disk $e'$, while the former pass up through the top cross-frame, $a'$, which forms a guide therefor. The bearings $d'$ carry the shaft of a guide-pulley, $y$, over which passes the strap attached to drum $w$, by which the monkey is raised.

Upon the plate $i$, and in rear of the bearings $d'$, are two other circular recesses, $g'$, Figs. 5, 6, 7, 8, also containing spiral or india-rubber springs compressed to an initial pressure by means of glands $h'$, as shown in the various figures, adjusted by screws and nuts and pressing upon a central disk, $i'$, provided with guide-rods projecting above and below it, the former passing through the springs into the metal and the latter traversing the glands $h'$. On the ascent of the monkey $k'$, Figs. 1, 2, 7, 8, the bosses $j'j'$ thereon strike against the rods $l'l'$ that project from the glands $h'$ and compress the springs. The upper rod $l'$, which is in contact with the lever $m'$, Figs. 1 and 6, thereupon raises the latter, compresses the spiral spring $n'$, rocks the arm $o'$, which is connected by shaft $p'$, Fig. 2, to the arm $q'$, which draws back the horizontal bolt $r'$, Fig. 6, which may at any time be kept retracted by attaching to the arm $o'$ or other crank in connection with shaft $p'$ a chain or wire, (indicated in dot and dash lines in Figs. 1 and 6,) and terminating in a ring which is hooked to the standard $h$. The plate $i$ is also provided on its under surface and a little in advance of the strap with two ears, $s'$, in which is mounted a rock-spindle, to whose ends are fixed two hooked arms, $t't'$, Figs. 1, 7, 8, which are oscillated by being connected by the shaft $v'$, before described.

The monkey $k'$ is of cast-iron, and may be varied in form as desired. To connect it to the strap it is attached by means of a dovetailed joint to a block of metal, $l^3$, Figs. 1 and 7, provided with a pair of knuckles, through which passes a pin, $m^3$, whose ends project, as shown in Figs. 7 and 8, for the suspension-hooks $t't'$, Figs. 1 and 7, to take hold of, and on which the monkey rests under the initial pressure of the springs above when it is desired to suspend the fall of the hammer.

Fig. 7 shows the monkey in the elevated position, and Fig. 1 shows it dropped.

The middle part of the pin $m^3$ is the joint-pin connecting the block $l^3$ to a link, $n^3$, Figs. 1 and 2, upon which are lapped a number of leather strips stitched together and built up of the rounded form shown, and around which the lower end of the strap $x$ is passed and secured by screw-studs, as shown in Fig. 1. Two advantages derived from this arrangement are, first, that the length of the bight formed by the end of the strap is increased, and, second, that an elastic cushion is provided at this point of the strap, where it is subject to considerable strain when the monkey is suddenly raised by the friction-gear or when it is arrested at any point of its fall.

It will be seen in Fig. 1 that the strap, whose breadth is adapted to the weight to be lifted, may gradually increase in breadth from the point of attachment upward to its opposite end, thus affording a secure connection to the winding-drum $w$.

The automatic friction-clutch gear for raising the monkey is adjusted by the hand-lever $c^3$, Fig. 2, which is free to oscillate when the horizontal bolt $r'$, Fig. 6, has been held retracted, as above stated. By means of this lever $c^3$ the monkey can be at first slightly raised and then allowed to fall, the tappet $t^2$, Fig. 11, being at the same time adjusted until brought into sufficient contact with the end of lever $q^2$, in order that the latter may, after one or two trials, substitute its action for that of lever $c^3$, the latter being left connected or not with lever $q^2$ by the cotter $n^2$, which is inserted before commencing the adjustment. This done, the monkey is now raised by the action of the hand-lever to its full height, after which the hand-nut $m^2$, Fig. 11, may be adjusted so as to raise or lower lever $q^2$, and thus regulate the intensity of the blow. Percussive effects of any force desired may thus be obtained at will without the swage or tool remaining in contact with the article being shaped. When the ascent of the monkey has been thus made dependent on the action of lever $q^2$ and the friction-clutch, the horizontal bolt $r'$ is again put in action, as are also the holding-up hooks $t'$, (if the continued-motion action of the hammer is not required.) In either case it will be observed that the monkey in rising at its full velocity should at every stroke strike the rods $l'$ $l'$ and store up initial force, until the moment when the lever $m'$, Fig. 6, lifted by the blow, withdraws the horizontal bolt $r'$ and allows the vertical bolt $g^2$ to be raised by the action of the springs $j^2 j^2$, Fig. 2, thus throwing the friction-clutch out of gear. As all the changes of motion of the monkey require to be performed very quickly, recourse is had to a guide-pulley, $y$, Figs. 1, 2, 7, mounted on spring-bearings in order to attenuate the shock and strain, which, combined with the modes of attachment and winding of the strap, as herein described, insures great advantages. This system of hammer is so arranged as to be capable of regulating the initial force, and thereby permit of instantly restoring the full extent of motion to the moving parts without the grave objection of bringing entirely upon the strap the incessant concussions produced during the working.

The foregoing arrangement, as well as the following modification, may be readily combined with the ordinary starting-gear of steam-hammers by directly connecting the rod $b^3$, Figs. 2 and 1, to the toggle $c^2$, Fig. 1, and by retaining, if desired, the initial force due to the upward blow of the monkey, and with or without the means of holding the monkey suspended.

It will be understood that the details of construction of the various parts will necessarily vary according to circumstances.

In order that the general operation of the machine already described may be fully understood, I will briefly condense the same. Supposing the monkey $h'$ is raised, being held elevated by the hooks $t'$, that catch under its pins $m^3$, at this time the springs in the cavities $g'$ are compressed by the glands $h'$, because the monkey, by its bosses $j'$, strikes and slightly lifts the rods $l'$. Thus the monkey is suspended under what I have already termed "initial pressure," and at the same time, by one of the rods $l'$ moving the lever $m'$, the bolt $r'$ is retracted, so that everything is in readiness for letting the monkey drop; for it will be understood from what I have already stated that unless the bolt $r'$ is retracted the bolt $g^2$ cannot be lifted, and therefore the rod $f^2$ could not be raised to move the toggle $c^2$ and disengage the clutch. The elevated monkey thus holds the bolt $r'$ retracted, and is itself under initial pressure, and the clutch is disengaged, because the bolt $r'$ being retracted, the springs $j^2$ lift the rod $f^2$, contract the toggle $c^2$, and move the levers $e^2 m$, thus opening the clutch. When the monkey is to be let go, the rod $b^2$ is pulled, thereby swinging aside the hooks $t'$ and letting the monkey drop. As it drops it strikes, by means of the tappet $t^2$, the lever $q^2$, and pulls down the rod $f^2$, elongates the toggle $c^2$, and sets the clutch in action, so that now the clutch will at once turn the pulley $w$, which draws the strap $x$ around the spring-supported pulley $y$ and lifts the monkey up again. If the monkey is to move up and down continuously, this can be effectuated by simply leaving the rod $b^2$ undisturbed after it has once been used to pull the hooks $t'$ aside and let the monkey drop; but if it is desired to hold the monkey suspended in its elevated position, the rod $b^2$ is pushed up so as to bring the hooks under the pins $m^3$ in manner shown in Fig. 8.

In the modified form of machine of this invention for obtaining results identical with the foregoing, but considerably greater as regards the velocity on impact, certain modifications are made in parts of the apparatus above described—viz., first, as regards the method of absorbing the excessive vibration of the metal framing, which must be made commensurate with the increased intensity of the concussion due to the velocity of impact; secondly, as regards the means of regulating or rectifying the play of the monkey with an increased fall by means of standards, which are themselves provided with a sufficient number of guides, and which are isolated from the working parts of the machine in order to permit of their adjustment as easily as in the preceding arrangement; and, lastly, as regards the position of the friction-clutch, which, owing to the increased height of the standards, could not be placed at the top of the machine.

Figure 15:
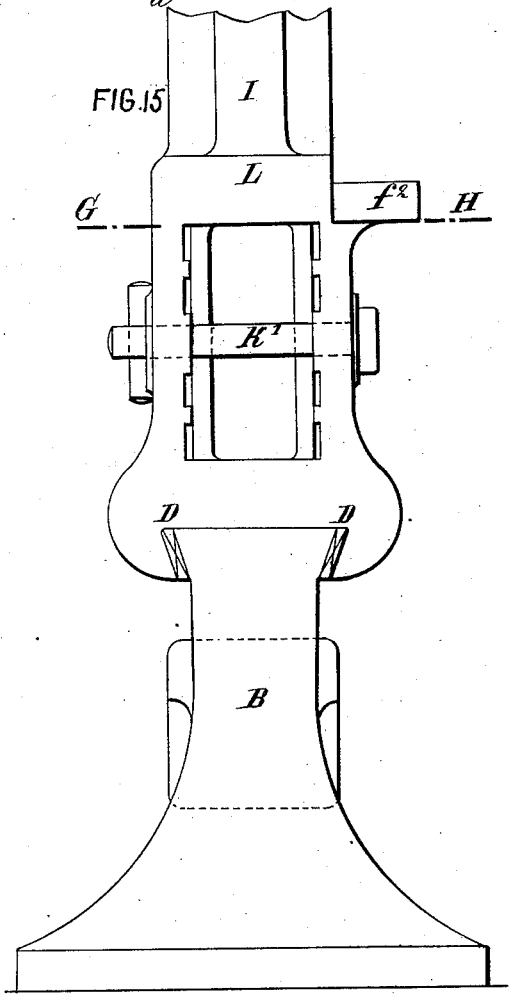

The apparatus for absorbing vibration and adjusting for wear may, according to circumstances, either be cast with the base, as in Figs. 31, 33, and 34, or be firmly fixed thereto, as in Figs. 12 and 13, or it may be movable on said base, as in Figs. 14 and 15, in which latter case the apparatus would be cast with the standards. In the two other cases the arrangement, Fig. 19, hereinafter described, is introduced in the machine, of which the internal form remains the same in principle, the dimensions only being varied to suit different applications. This part of the frame, which is of rectangular form where it rises from the base of the machine, is in all cases formed with an opening, $a\,b\,c\,d$, Fig. 12; also shown in sectional plan on line E F at $e\,f\,g\,h$, Fig 19, the opening being merely formed by casting, as seen in plan, without any fitting. The two vertical sides $a\,d\,b\,c$ are held rigidly fixed by means of a cotter-bolt, K, passing entirely through, as shown in the several figures.

Fig. 19 is a sectional plan on line E F, Fig. 12, and shows a central block, $o\,p$, provided with ribs $o\,o$, forming guides for the monkey. This block is shown in side view, Fig. 18. The block, which, as shown, is introduced into the opening in the framing, may be made of cast or wrought iron or steel, and is independently movable in all directions. The block, whose form is clearly shown in Figs. 18 and 19, is of such size as to allow of the introduction first of two sheet-iron plates, $m\,m$, next of two hard-wood blocks, $n\,n$, and then of as many layers of leather, $q\,q$, as are required to afford the necessary elasticity, the leather being first glued under pressure to the wood blocks and to one another. Upon the front face, $p$, of the metal block are also riveted two or three strips of leather, $r$, to form elastic contact-surfaces for the iron cross-bars $s\,s\,s$, (shown in position in Figs. 31, 34, and 36, and also in Figs. 18 and 19,) and which are secured by screw-studs and nuts, as shown.

It will be seen on referring to Fig. 18 that the hard wood blocks which are introduced, together with the metallic guide-block $o\,p$, abut at one end against the return-pieces $f\,g$, while wood keys $t\,t$, Figs. 18 and 19, are driven in between their other ends and two shoulders at the rear of the metal block. The purpose of these keys is to allow the metal block $o\,p$ to be drawn away from the monkey M′, Fig. 36, should the fit be too close. This adjustment of the block is obtained by loosening the nuts that hold the arms $s\,s$ and driving in the keys $t\,t$. On the other hand, to take up wear, the keys $t\,t$, whose ends always project within reach of an operator's hammer, as shown in Fig. 36, are driven upward and the nuts of cross-arms $s$ tightened so as to press the guide-block $o\,p$ against the monkey. This done, a corresponding thickness of wood is removed from the keys, after which they are again driven in and the parts adjusted as at first, the keys $t\,t$ occupying their original position. After this adjustment the iron keys $u\,u$ are driven in, their number varying according to the internal height of the adjustment, but which are shown in the drawings as being eight in number, made slightly tapering in thickness, and bearing, while being tightened up, on the one side against the metallic framing, which is held at an invariable distance apart by the cotter-bolt K, and on the other side against the sheet-iron plates $m\,m$, Fig. 19, which they press against the elastic wood and leather packings. These keys $u\,u$ may pass entirely through, as seen in the section, Fig. 19, at $f$ and $g$, or they may be wedged up as required without interfering either with the cross-arms $s\,s$ or the wood keys $t\,t$. Immediately both sets are secure—that is to say, after the iron keys are in position—they are fixed by means of eight set-screws with slightly hardened conical points $v\,v$, as indicated in the several figures, which, on being screwed up tight, slightly penetrate the keys and thus prevent their moving either forward or backward by the effects of concussion. By tightening up these screws upon the keys also the guides of the metal block $o\,p$ may be connected more perfectly with those of the standards, which, as will presently be seen, are placed immediately over them. The height of the metal guide-block should always considerably exceed that of the monkey, so that the latter shall always be isolated from the standards at the moment of impact. The bolt K shall always be cottered very tightly before the iron keys are driven in, said bolt or bolts (the number employed varying according to the height of the block) being intended to prevent the slightest bulging of the side frames, whatever may be the pressure of the iron keys. The hole in the metal guide-block $o\,p$ through which the bolt K passes is made slightly oval in order to allow, as shown in Fig. 18, of the advance of the block under the pressure of the cross-arms $s\,s$, which adjustment should only be effected after having loosened all the set-screws pressing on the iron keys by slightly driving out the latter and by driving down the wood keys $t\,t$. The nuts may then be tightened upon the cross-arms $s$. It is not necessary to entirely withdraw the iron keys, and it is often necessary to reduce the wood keys in order to let their points project after adjustment. In all these adjustments it is the iron keys $u\,u$ which shall be the first to be loosened and the last to be returned to their places, the operation being finally terminated by tightening their set-screws.

Fig. 13 shows a face view of the same parts as represented in side view in Fig. 12, mounted upon the base B. The latter may be of any form, it being only necessary to provide that shown in Figs. 31, 34, and 36 with the dovetail projections A A, Fig. 12, to enable the apparatus to be also connected to this base by means of the dovetail projection C and the two keys D D. The two forms of base are thus identical as regards the action of the apparatus mounted and fixed thereon, and either arrangement may be adopted, according to the dimensions of base required; but whatever may be the mode of connection, means for absorbing or isolating the concussions and means of adjustment by means of keys $t\,t$, acting independently of the standards, would in all cases be provided. Fig. 15 represents the same adjustment, the cheeks, united by the through cotter-bolt K′, being cast in one with the standard I. Fig. 16 shows the central metal block, $o'\,p'$, with double guide-ribs $o'$, to be the same as before, and said block also works freely between the side pieces, being movable in all directions and separate from the standards. The block is packed, as before, with the sheet-iron plates $m'\,m'$ and wood blocks $n'\,n'$, with the necessary number of sheets of leather, $q'\,q'$, glued together, the whole being secured by means of light iron keys $u'\,u'$, fixed by as many set-screws, all as before. The only difference between this and the preceding arrangement is that the two wood keys $t\,t$ are dispensed with, the whole thus forming a simple arrangement for absorbing or isolating concussions.

Figure 23:
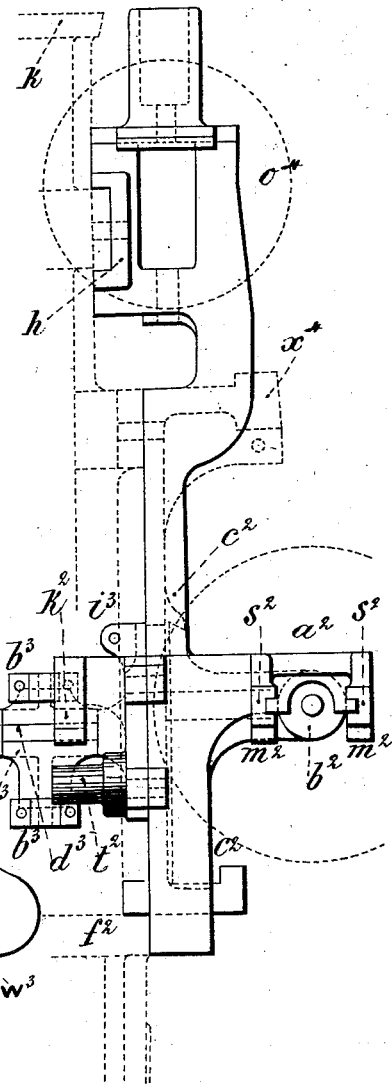

The regulation or adjustment of guides to compensate for wear is effected by means of the keys $w\,w'\,w^2\,w^3$, Figs. 22 and 23, inserted at the under side of the plate upon which the friction-gear is mounted, at either side of the dovetail projections $f^2$, upon which said plate is mounted. In order to take up for wear, it is simply necessary to slacken the two keys D D, Fig. 15, and to increase the thickness of key $w$, Fig. 22, and reduce that of key $w'$, so that on again tightening up the two keys the standards will be forced toward the monkey to the required extent. Either standard may be adjusted separately, and, this done, the keys D D in the base are then driven home and the adjustment is complete. This last arrangement is especially suited to short drop-hammers, as it retains the entire advantage of elasticity at the moment of impact, combined with a mode of adjustment at the base which is of sufficient stability so long as the hammer has only a short fall.

The only real difference between the two arrangements shown in Figs. 17 and 18 is that in the one case the keys $t\,t$ are not used, while the difference between Figs. 13 and 14 consists in the absence in the one case of the flange M N, forming an abutment for said keys, said abutment being replaced by the mode of uniting the standard to the side cheeks, as shown at L, Figs. 14 and 15, which involves no alteration in the form of the cross-arms $s\,s$, (shown in dotted lines in Figs. 17 and 18,) nor in the position of the screw-bolts, as shown in Figs. 31 and 34. The same base B, broken at the middle, is illustrated in both examples; but, as before mentioned, the form of the base is quite optional.

The above arrangement, besides the advantages mentioned, also has that of guiding the monkey by two or three angular or square projecting ribs or guides instead of a single central one, as usual. It will be readily understood that a monkey of considerable width, when centrally guided only, is entirely wanting in stability at the moment of impact, thus causing a rapid wear of the surfaces in contact, which are not protected by any elasticity whatever, even in the shortest drop. The result of this has hitherto been that as soon as any play not capable of being compensated for occurs the guides in one with the base have been broken, thereby rendering the entire framing useless, owing to the difficulty of effecting the repair of the damaged part. All the disadvantages are obviated by the present system, even in the improbable event of the central guide being broken, as it may easily be replaced by a duplicate, which may even be provided beforehand, and adjusted by the templet used for the monkey, and may be made of selected metal. If in Figs. 20 and 21 that part or foot $a\,b\,c$ of the standard be considered, which is situated between the top of the adjustment just previously described, and the lug $d$ connecting said standard to the plate carrying the friction-gear, as shown in dotted lines in these two figures, it will be seen that there is no difference between this portion of the standards and that represented in Figs. 31 and 34, in which the fall differs considerably. The foot $a\,b$ has two lugs, $e\,e$, and in Figs. 31 and 34 it will be seen that these lugs, which are held between two nuts, serve for advancing the standard toward the monkey M′, when adjusting the parts for wear, after loosening the screw-bolts $f$, Fig. 20, which pass through oval holes in the foot, as likewise those in the lugs $d\,d$ for connecting the standards to the plate carrying the friction-gear, Figs. 31, 34, 20, and 21. The lug or tenon $b\,c$, Figs. 20 and 21, is also shown in dotted lines in Figs. 31 and 34. These projections are recessed their entire depth in the upper part of the frame of the adjustment above described and carefully fitted, so that the standards can only slide forward by preserving a symmetrical position with regard to the axis of the machine. On referring to the several figures it will also be seen that the projecting ribs or guides which engage with the monkey extend down to the bottom of the lug $b\,c$, so as to fit close down on the top of the guide-block before described, so that by tightening up the eight iron keys, and then fixing the same by their corresponding set-screws, the alignment of the guides may be effected in the most precise manner. The standards would be first placed in position so as to serve as a guide for those of the guide-block placed immediately beneath them. The distance between the lugs $d\,d$ and the shaft $g\,g$, Figs. 31, 34, and 36, available for increasing or diminishing the height of fall, will be seen by comparing Figs. 31, 34, and 36 with Figs. 20 and 21, where the shaft $g\,g$ is nearly on a line with the lug $d$. The shaft $g\,g$, as shown in Fig. 31, passes freely through two bearings cast on the standards, and nothing prevents the two standards being adjusted toward each other when the wear of the guides renders this necessary.

Referring now to the slides $h\ h\ h$, (shown in Figs. 31, 34, and 36, as well as in Figs. 20, 21, 22, and 23,) it will be evident that here also there is no impediment to the adjustment of the standards if the holes be made oval for the bolts connecting the inner slide to the bearing-bracket $i\ i\ i$ of the guide-pulley, which is shown in Figs. 34 and 36, as also in Figs. 22 and 23, for short falls.

Referring to the heads $k\ k\ k$ of the standards, Figs. 31, 32, 34, and 36, and also Figs. 20 and 21, it will be seen that by simply knocking out the two keys $k'\ k'$, Figs. 34 and 21, and slacking the screws L L, Figs. 31, 32, 36, and 20, the standards may be made entirely free without interfering with any movement whatever may be the height of fall adopted.

It will be understood that in effecting any adjustment one standard only is moved at a time, and therefore the adjustment is made on one side only, and several adjustments may even be successively effected on the same side, as they are not frequently required, and if made in time need only be slight. This explanation clearly shows that the problem of isolating the standard and its corresponding guide-block is solved, inasmuch as the system of adjustable guides is only connected to the various movements in such manner as not to interfere with the adjustment for falls of any height and for the entire length of guide. It was therefore necessary either to completely solve this problem of adjustment by acting on the whole of the guides together, or to leave the arrangements as they actually stand, and simply absorb the excessive vibrations of the metal, which is always possible on this system, either by employing the type of machine shown in Fig. 14, which is fixed rigidly to the base instead of being movable thereon, or by casting the base and uprights in one piece, in all cases retaining the principle of absorption, with a central block fitted between elastic surfaces. It is evident, moreover, that precision in guiding is especially essential and indispensable at the moment of impact, and that it is necessary in setting up the parts to allow a very little latitude to the monkey from the bottom to the top of the standard, without, however, allowing this latitude to produce in long falls the vibration of the monkey in its guides, otherwise the shocks produced in sliding would, as in existing hammers, cause a great part of the effects due to gravity to be wasted, which on this improved system may be obtained with great facility. Thus it is simply necessary in setting up the standards to make them slightly deviate from the vertical at the point of contact of the foot $a\ b$ with the absorption apparatus by removing a little of the metal toward the outer end, $a$, only, so that the standards, when adjusted toward each other, always preserve the same relative direction, and the monkey, when raised, will be slightly easier in its guides, which will facilitate its starting, and will, on reaching the bottom of its drop, be guided as correctly and as thoroughly as desired.

The monkey adopted for this machine has, as shown, double parallel guides at each side, so as to increase the friction-surface and also its stability at the moment of impact. The groove $m$, made the whole length of the monkey, Figs. $20^{bis}$ and $21^{bis}$, serves for the self-acting motion of the friction-clutch, as will be hereinafter described. The eyes $o$ are traversed by a pin, $n$, projecting at each end, and retained in position therein by cotters, as shown in Figs. $20^{bis}$ and $21^{bis}$. The projecting ends of the pin $n$ serve for the automatic engagement of the hooks near the top of the machine, for which purpose the ends are flattened on the under side, as will be afterward referred to, the hooks passing between the ears $o$ and the central guides, $p$, which project from the top of the monkey, and which automatically disengage the friction-clutch, as hereinafter described.

Figs. 22 and 23 show both the form of the plate carrying the friction-gear and also the modification in the top part of said plate for changing from a long to a short fall. They also show the solid connection between the thrust-bearing $a^2$ at the one end and the abutment $b^2$, Figs. 22, 23, and 36, at the other end, as well as the seat $c^2\ c^2$, which supports the bearing-brackets of the driving-shaft $d^2$, Figs. 29 and 36, the brackets being keyed in said seat, which has the necessary flanges at top and bottom, and bolted to the plate by the bolts $e^2\ e^2$, Fig. 36. The plate is connected by means of the dovetailed extensions $f^2$, Fig. 22, and adjusting-wedges $w\ w'\ w^2\ w^3$, when employing the standard, Figs. 14 and 15, and the absorption apparatus, Figs. 16 and 17, before described, or by means of screw-bolts $g^2\ g^2$, as shown in Figs. 34 and 36. In Figs. 22 and 23 the upper part of these apparatus, as well as the standards, is indicated in dotted lines as attached to the plate at $f^2\ f^2$, while $h\ h$ show the slides connecting said standards to the new form of forked bracket or casting supporting the guide-pulley. These figures also show in dotted lines the position of the two pulleys, whereby it is rendered apparent that no change is needed in the bearings of said pulleys, the upper pulleys being in all cases furnished with the same guides and having the same elastic action as in the general views, Figs. 34 and 36. The distance only between the two pulleys varies with the height of the fall. At $i^2$, Fig. 22, is fixed the plate carrying the friction-clutch, said plate being shown in elevation divested of its adjuncts in Fig. 23.

The bracket $k^2$, Figs. 23, 27, and 28, is of the same form as those $m^2\ m^2$ for the thrust-bearing $a^2$, and being thus solidly connected together they serve to carry the shaft $h^3$, Fig. 28, which transmits the action imparted to the first lever, $j^2$, Fig. 27, connected with two other levers $n^2$ $n^2$, Figs. 27, 31, 34, 35, and 36, so as to force the frame $l^2$, Fig. 35, to exert the thrust of its pivot $o^2$ against the pivot $p^2$ of shaft $q^2$, Figs. 29 and 35, which carries the metal friction-ring $r^2$ $r^2$. It will be observed that the end of the shaft $q^2$, as well as its retaining-collar $p^2$, passes freely through the front end of the movable frame $l^2$, which itself slides with sufficient freedom in the grooves $s^2$ $s^2$, Figs. 23 and 35, of the thrust-bearing $a^2$. The metal friction-disk transmits the pressure to the spiral coil of leather described in the specification of the former English patent referred to, thereby imparting motion to the second disk upon shaft $d^2$, on which is keyed the winding-drum for raising the monkey.

As shown in Fig. 29, the disk carrying the friction-ring $r^2$ $r^2$ has a pulley-rim, which is connected to and bears on a disk, $z^2$, loose on shaft $d^2$. This pulley is shown in position in Fig. 36, and also with its driving-band $D^2$ in Fig. 34, as well as the winding-drum $d^2$ for raising the monkey.

Next to the bracket $k^2$, Fig. 23, is the boss $t^2$, Figs. 23, 27, and 28, which carries the shaft on which is mounted at the back end the crank, Fig. 27, to which motion is imparted by the connecting-rod $u^2$. (Shown in dotted lines.) At the front end of said shaft is the fork for imparting motion to the flanged collar $v^2$, which transmits it to the vertical shaft by pressing on the key $w^2$, the latter being removed when it is not desired to work the hammer automatically, and to substitute a hand or foot motion, as indicated in Figs. 31 and 34, and hereinafter described. In order to produce this action upon the vertical shaft and force the same downward, so as to throw the friction-clutch into gear at the moment the monkey M' strikes the article being forged, I fix in the vertical groove $m$, Fig. 36, $20^{bis}$, and $21^{bis}$, made the entire length of the monkey, a slide-block, $y^2$, secured by a bolt or bolts, which, according to the height at which it is adjusted, will either just before the moment of impact (thereby diminishing the intensity of the blow) or at the moment of impact strike the lever $x^2$, and thereby force back the connecting-rod $u^2$, Figs. 27, 36, and 31, draw down the vertical shaft which traverses the toggle $a^3$, Figs. 27 and 31, which, in straightening, moves toward the vertical the levers $j^2$ $n^2$, fixed to shaft $h^3$, mounted in the three brackets $k^2$ $m^2$ $m^2$, as shown in Figs. 31 and 34, and thereby, by means of frame $l^2$, Fig. 35, and its pivot, $o^2$, press on this pivot of shaft $q^2$. In Fig. 36 are shown the center lines of the entire movement, the tappet $y^2$ having just commenced to act on lever $x^2$, while in Figs. 31 and 34 is shown the entire arrangement as applied to the machine. It will be understood that by adjusting the tappet-block $y^2$ it will be always easy to prevent the tools resting upon the forging, which advantage is equally due to the slight pressure required with this system of friction-clutch to check the monkey, not only at the moment of impact, but at any point of its fall, which explains the object of using the elastic bearings of the guide-pulley—viz., to protect the strap and its connections from the effects of the shocks produced at the end of each drop. This elastic suspension arrangement will be described later on.

Fig. 23, besides showing the bearing $k^2$, as described, also represents the bracket $c^3$, Figs. 27 and 28, which supports the bearings $b^3$ of the vertical toggle-rod, as well as the abutment $d^1$, which is channeled in the casting, against which the one member of the toggle bears, so as to cause the thrust to be applied to lever $j^2$ when the toggle is straightened by the vertical rod acting upon the joint-pin $f^3$. To permit this movement, the hole in the rectangular block $e^3$, Figs. 27 and 28, through which the pin $f^3$ passes, must be made oval, as indicated in dotted lines in Fig. 27, said pin being of reduced diameter at the ends which pass through the plates $g^3$ $g^3$, which connect the two members $a^3$ of the toggle, as shown. The set-screw $h^4$, Figs. 27 and 28, enables any looseness in the connection of the outer member of the toggle with the lever $j^2$ on the shaft $h^3$, Figs. 28 and 34, to be rectified.

At $i^3$, Figs. 23, 27, 28, 31, and 34, is jointed the forked lever $j^3$, Figs. 31 and 34, which bears upon a collar, $k^3$, connected to the toggle-rod and to the rod $l^3$ of the vertical bolt No. 4, by which the friction-clutch is automatically thrown into gear. The bolt and its rod are both shown in Figs. 31, 32, and 34. The forked lever $j^3$ is at the same time connected to the hand-lever $m^3$ by the rod $n^3$, Figs. 34 and 31, thus enabling the friction-clutch to be operated either by the machine or by the hand-lever, according to whether the cotter $w^2$ shown in these figures and also in Fig. 27 is or is not in place. In the first case it is the tappet $y^2$ which, as before mentioned, straightens the toggle $a^3$, and in the second case (when the cotter is withdrawn) it is the lever $m^3$ which operates the toggle, said lever being either worked by hand or by the treadle $O^3$. (Indicated by dotted lines in Fig. 31.) The arrangement of said hand-lever or treadle may be varied according to the position which the mechanism above described occupies in the machine. Three distinct effects may be thus produced by the movement of the vertical bolt No. 4, and it will be seen further on how these motions are utilized in the working.

The detail which is represented in Figs. 24, 25, and 26 is carried on the cross-frame connecting the heads of the standards for falls of any height. Near the ends of said cross-frame are seen the lugs represented in dotted outline in Fig. 20 and 21, as well as in the general arrangements for keying the cross-frame to the tops of the standards. Upon the under side of this plate, toward its center, are formed the lugs $p^3$ $p^3$, Figs. 24, 30, and 31, and between them are screwed two cotter-bolts, by which the head of the hanger $q^3$, Figs. 30 and 31, is secured both at its middle and ends. To the lower ends of the hanger is jointed by pin $s^3$ the forked arm carrying the hooks $r^3$, which swing back when their beveled ends are struck by the projecting ends of the joint-pin $n$ of the monkey. The hooked fork $r^3$ is jointed at its lower end to shaft $g$, and in receding raises the counter-weight $t^3$, Figs. 30, 31, and 34, which immediately after the pin $n$ has passed falls back on its support $u^3$, Figs. 20, 31, and 30, returning the fork to its vertical position with its hooks beneath the flattened ends of the pin $n$, thus holding up the monkey M' until the fork $r^3$ is drawn back by acting on crank-arm $a^4$, rod $y^3$, from lever $v^3$ or treadle $x^3$. The lever $v^3$ may be locked by a bolt passing through a slotted sector, $b^4$, so that when it is not desired to hold up the monkey the hooks may be moved and held out of action by locking the bolt by its locking-lever $c^4$. In this manner a self-acting repetition action is obtained, as hereinafter described. The same cross-frame has at its center, and well in the center of the standards, a cylinder cast in one with it, the whole being strengthened by ribs, as shown at $d^4$, Figs. 24, 30, and 31. This cylinder $d^4$ is shown in all the figures where the cross-frame is applied, and it has a cover secured by cotter-bolts, as shown in Figs. 31 and 34. The cylinder may either contain a spiral spring or india-rubber rings with internally-flanged iron washers between. The rod $e^4$, Fig. 31, which passes through the india-rubber rings is of reduced diameter, but has a shoulder for the bottom washers, $f^4$, to bear against, as in Fig. 30, the diameter of the rod being from that point downward equal to that of the cross-head $g^4$, Figs. 30 and 31, to which it is connected, and which extends across the standards, and which is placed in position at the time of erecting the standards. The rod should be allowed a little play where it passes through the cross-frame and cylinder-cover, and should always project sufficiently above the latter when in position of repose—that is to say, when the monkey is hooked up—in which case, as will presently be seen, and as shown in the figures, there is an increased pressure upon the india-rubber blocks in addition to the initial pressure of the cylinder-cover. The cross-head $g^4$, as shown in Figs. 30 and 31, rests upon the heads of the push or slide rods, No. 1, which work in guides $h^4$, bolted to the standards, and always remaining attached to the same, both while adjusting them closer together for wear or reducing their height for obtaining a shorter drop, as is also clearly shown in Figs. 20 and 31, where one is drawn in dotted lines upon its supports $i^4$, between which these rods slide, and which also serve as supports for the guides $h^4$ to prevent their being displaced by the concussion. The heads of these two rods, Figs. 30 and 31, rest on the upper ends of their guides when the monkey is not held up, and thus support the shoe-rods, the cross-head, and its rod. The initial pressure of the india-rubber springs is produced between the washer $f^4$ and the cover of the cylinder. Supposing the initial pressure to equal one-fifth or one-sixth of the weight of the monkey, with the slide-rods and cross-head at rest, and the speed being known at which it is desired to raise the monkey, from which is deducted the exact amount of work done in passing the pin $n$ from the under to the upper side of the hooks, it will be at this speed that the upwardly-projecting guide-ribs $p$ of the monkey, Fig. $20^{bis}$, will strike against the lower ends of the two push-rods No. 1, thus raising the cross-head $g^4$, its rod and washer $f^4$, until the ends $n\ n$ of the pin on the monkey are above the hooks. From this moment the pressure upon the springs increases in intensity, while the effect due to the shock is reduced to the necessary extent. There is thus an available downward pressure on the hooks, which will accelerate the fall of the monkey, and which considerably exceeds the inertia of all the parts connected to the strap, and is added to the effect of gravity.

Figs. 30, 31, and 32, in which the monkey is supposed to be held up and the springs compressed, show how the rods No. 1 have added the necessary pressure to the initial pressure, as in neither of these figures do the rods rest upon their guides. Figs. 31 and 32 also show that one end of the cross-head $g^4$ has keyed to it an inclined cam, No. 2, which acts upon the inner angle of a spring-bolt, No. 3, fitted to slide upon a seat, $a^5$, Figs. 24 and 25, on the top cross-frame, the bolt No. 2 passing through an aperture, $j^4$, in the cap-piece $k^4$, Figs. 31, 32, and 33, fixed upon the cross-frame, and against which the shoulders $l^4\ l^4$, Fig. 33, of the bolt No. 3 are pressed by its springs. At the same time that the pin $n$ on the monkey passes the hooks $r^3$ the monkey strikes the rods No. 1, raises the cross-head $g^4$, draws the bolt No. 3 partly back, as shown in Fig. 32, so that the bolt No. 4 is still partly covered, and the friction-clutch still exerts its full effect upon the lifting-strap, so that the monkey will be raised a little higher to facilitate its engagement with the hooks. The bolt No. 3, being by this time drawn quite back, liberates bolt No. 4, and the three spiral springs (shown in Figs. 31 and 34 on each end of the rod $l^3$, which were compressed by the straightening of the toggle) react and raise both the toggle and bolt No. 4, which comes in turn in front of bolt No. 3, and remains in this position during the whole time that the monkey remains hooked up under the initial pressure, as above described. When by means of the hand-lever $v^3$, Figs. 31 and 34, or the pedal $x^3$, the monkey is unhooked, and its tappet $y^3$, Figs. 31 and 36, strikes the lever $x^2$, the toggle, being again straightened, compresses the three spiral springs, acting upon the rod $l^3$, draws down bolt No. 4, and throws the friction-clutch into gear. The horizontal bolt No. 3 is now pushed by its springs over No. 4, and there remains until the necessary pressure has been stored up by the upward shock of the monkey acting through the push-rods No. 1 and the cross-head, and the bolt No. 3 is again retracted and the monkey is again hooked up. The cross-frame, Figs. 24 and 25, also carries an iron yoke, $m^4$, embracing the cylinder, and attached by its bent end to the guide-rods of the springs of bolt No. 3. (Shown in position in Fig. 33.) The other end of the yoke terminates in a ring, to which is attached a cord or chain, which passes over a pulley, $n^4$, mounted in a bracket attached to the cross-frame, and runs down along the standard to within reach of the workman, who, by drawing it down and making it fast, may either throw the automatic engaging motion of the friction-clutch out of action, in order to substitute the hand or foot motion or arrest the monkey at different heights, so as to vary the drop. It is to be observed that this system differs from those now in use by the novel application of the shock on the ascent of the monkey, of which the effort is stored for the purpose of obtaining an initial pressure in a latent condition, which imparts an impulse to the monkey at starting, and to overcome the inertia of the working parts of the machine. The holding-up hooks, which keep stored up the power thus obtained, serve also to arrest the monkey by suspending its action. In fact, if an engine be used, the monkey is generally applied upon elastic bodies without intermittence in the effect of the shock on the materials, so that the part which operates the monkey, possessing in itself no appreciable elasticity above, supports all the reaction, and by this fact considerably limits in practice the ascensional velocity which it is possible to utilize. It is evident, for instance, that if in this system the strap were obliged to support at each blow the more or less complete arrest of the falling mass at the bottom of its fall without intermittence of the effect produced upon it by the *vis viva* developed, its attachments and the strap itself could not support the strain, especially in the case of long falls. Similarly, in exceeding in the interest of the work to be done in ascensional velocity all that has been hitherto practiced, it would happen that at the moment of the shock of the monkey against the push-rods the strap would also have sustained without intermittence reaction strains which it would sustain with difficulty. There is, moreover, a great difference between the effects of reaction due to the automatic working, which are absolute, and those due to the arm of the workman, which are generally only relative, upon the same friction-gear, and consequently upon the transmitting mechanism. For these reasons the guide-pulley $O^4$, Figs. 34 and 36, is carried by a shaft, $v^4$, mounted in sliding bearings $p^4$, furnished with guide-rods, of which the lower one, as well as the frame of the bearing, is guided in the forked casting $i$, while the upper one passes through the cylinder $q^4$ and terminates above the same in nuts, which bear on a disk, $r^4$, entering freely in the cylinder. It is between these disks $r^4$ and the bottoms of the cylinders that are placed the spiral springs or india-rubber rings, separated by washers, Fig. 34, and that one regulates the initial elastic pressure corresponding to the return shocks of the two extremities of fall of the falling weight. These cylinders are bolted on the casting by two screws. With the height of fall chosen for Figs. 31, 34, and 36 the casting $i$, besides its sliding attachments with the standards, is supported by a single or double T-iron strut terminating in cast-iron shoes $c^5$, Figs. 34 and 36, which are adapted by their shape to the shortening or lengthening of the T-iron strut by modifying them according to the angles of the various heights of fall, retaining the same attachments and the same movements. The lower shoe rests in the bracket $x^4$, Figs. 23 and 34, of the plate carrying the friction-gear, which bracket is supported, if necessary, by the fork $s^4$, embracing the drum on which the belt is wound, and connecting the bearings of the friction-clutch shaft. This arrangement is to consolidate the frame sufficiently for all heights of fall above one meter to one and one-fourth meter, it being remarked that for those of one and one-fourth meter and under it is sufficient to replace the bracket $x^4$ by the casting $i^4$, Fig. 20, and to apply the standards reduced according to the preceding indications relating to Figs. 20 and 21. The result of the elastic bearings for the guide-pulley is that at the moment of impact, as well as of the ascensional shock, the strap will first act on these elastic bearings, however suddenly the clutch may be thrown in or out of gear, will compress the springs to the necessary extent, and thereby store the intermittent reaction destined to act in the same direction as this strap to actuate the monkey. The effect deemed necessary for the safety of the strap is regulated by means of nuts at the upper end of the rod of the bearing. According as they are tightened more or less the initial pressure of the two spring-boxes is varied, it being only necessary to render this pressure equal to measure the projecting ends of the rods. The whole constitutes an arrangement which permits at little cost of varying the *vis viva* from the lowest to the highest, the changes being made in the velocities on impact only, without regard to the consequences which may ensue from the more or less great impulse given to the velocity of the mass, either in one direction or the other, since it meets at each extremity of its stroke with attenuations of the shock utilized and compensated for the best conservation of the parts, and also for imparting an initial velocity to the mass by restoring the effort produced by the shock and stored by the hooking up of the weight.

The general arrangements of this machine permit of all modifications of the height of fall without affecting its stability, and without having recourse to outside points of support, which enables it to be placed like an ordinary machine-tool within reach of the workshop shafting.

By referring generally to the movements described it will be seen that, first, by drawing back the holding-up hooks I effect with a continuous motion the throwing in and out of the hammer without other action than that of the engine; second, by raising by hand the horizontal bolt No. 3 at the moment when the monkey ascends in consequence of the automatic action I may reduce at will the stroke of the monkey, and obtain intermediate blows; third, by leaving the holding-up hooks drawn back and the bolt No. 3 withdrawn, if the cotter $w^2$ be withdrawn, I may by acting by hand or foot on the lever $v^3$ obtain the same movement as that of a steam-hammer—that is to say, regulate at will the height of fall and consequently the intensity of the blow—if it is desired only to draw the metal instead of swaging it; fourth, by placing the center of oscillation $m^5$ of lever $x^2$, Figs. 31 and 36, within the plate carrying the friction-gear—that is to say, on the side next the monkey—and by prolonging it downward to meet the tappet $y^2$, the rod $u^2$ will then be connected to this lever at its middle instead of its end. In either case by making this pivot $m^5$ movable upward—that is, by placing it in a slide and actuating it by a screw or a lever—I may, by slightly raising or lowering the center, complete when in operation the regulation of the clutch-gear without altering the position of the tappet $y^2$; but this is only a supplementary means of regulation for slight adjustments.

I claim—

1. The guide-bars $a\ a$, combined with the base $b$, leather packing-strips, and metal packing-strips $d$, substantially as herein shown and described.

2. The combination of the guide-bars $a\ a$ with the base $b$, leather packing-strips, metal packing-strips $d$, filling-block $e$, cover $f$, cap $c$, steadying-pieces $g$, and standards $h$, substantially as herein shown and described.

3. The combination of the rod $b^2$ with the crank-shaft $v'$, hooks $t'\ t'$, monkey $k'$, having pins $m^3$, and with the cushioned rods $l'$, substantially as herein shown and described.

4. The monkey $k'$, provided with the upwardly-extending bosses $j'$, and with the horizontally-projecting adjustable tappet $t^2$, substantially as herein shown and described.

5. The combination of the monkey $k'$ with the separable block $l^3$, pin $m^3$, and link $n^3$, the pin $m^3$ projecting beyond said block $l^3$, substantially as and for the purpose herein shown and described.

6. The combination of the monkey $k'$ with the tappet $t^2$, lever $q^2$, rod $f^2$, toggle $c^2$, levers $e^2$ and $m$, and clutch mechanism, as described, all arranged to set the clutch when the tappet $t^2$ strikes the lever $q^2$, as specified.

7. The combination of the vertically-movable rod $f^2$ and its bolt $g^2$ with the bolt $r'$, crank-pin $o'$, lever $m'$, and sliding spring-rod $l'$, substantially as and for the purpose specified.

8. The combination of the guide-pulley $y$ with the bearings $d'$, disk $e'$, springs on said disk, slotted frame $z\ a'$, plate $i$, and with the clutch mechanism shaft $v$, and wheel $w$, carried by said plate $i$, as specified.

9. In a power-hammer, the combination of a reciprocating monkey with cushioned and adjustable guides, substantially as herein shown and described.

10. In a power-hammer, the combination of a reciprocating monkey with cushioned and adjustable guides and with adjustable standards, substantially as herein shown and described.

11. In combination with the reciprocating monkey, the cushioned guides, and top springs that are compressed when the monkey is elevated, as specified.

The foregoing specification of my improvements in power-hammers, stamping-machines, or other similar percussion apparatus, signed by me this 25th day of June, 1884.

GABRIEL NICOLAS SCHOENBERG.

Witnesses:
ROBT. M. HOOPER,
ALBERT MOREAU.